United States Patent
Wu et al.

(10) Patent No.: US 9,063,333 B2
(45) Date of Patent: Jun. 23, 2015

(54) MICROELECTROMECHANICAL DEVICE AND METHOD OF MANUFACTURING

(75) Inventors: Joyce H. Wu, Somerville, MA (US); Jianru Shi, Havernhill, MA (US); Mark B. Andersson, Northborough, MA (US); Jasper Lodewyk Steyn, Winchester, MA (US); Timothy J. Brosnihan, Natick, MA (US)

(73) Assignee: Pixtronix, Inc., San Diego, CA (US)

( * ) Notice: Subject to any disclaimer, the term of this patent is extended or adjusted under 35 U.S.C. 154(b) by 294 days.

(21) Appl. No.: 13/486,722

(22) Filed: Jun. 1, 2012

(65) Prior Publication Data
US 2013/0322058 A1     Dec. 5, 2013

(51) Int. Cl.
| G02F 3/02 | (2006.01) |
| G02B 26/02 | (2006.01) |
| G09G 3/34 | (2006.01) |
| G02F 3/00 | (2006.01) |

(52) U.S. Cl.
CPC .............. *G02B 26/023* (2013.01); *G09G 3/346* (2013.01)

(58) Field of Classification Search
CPC ....... F21V 14/00; F21V 14/08; F21V 14/085; G02F 3/00–3/028; G02B 26/00; G02B 26/0816–26/0866
USPC .............. 362/97.1–97.4, 277, 279, 280, 321; 349/95, 104–111
See application file for complete search history.

(56) References Cited

U.S. PATENT DOCUMENTS

| 7,742,215 B2 * | 6/2010 | Hagood, IV .................. 359/233 |
| 2007/0002156 A1 * | 1/2007 | Hagood et al. ................ 348/296 |
| 2010/0110518 A1 | 5/2010 | Wu et al. |
| 2011/0255146 A1 | 10/2011 | Brosnihan et al. |
| 2012/0293852 A1 * | 11/2012 | Cho et al. ....................... 359/230 |
| 2013/0050290 A1 | 2/2013 | Andersson et al. |

FOREIGN PATENT DOCUMENTS

WO     2008091339 A2     7/2008

OTHER PUBLICATIONS

International Search Report and Written Opinion—PCT/US2013/039652—ISA/EPO—Nov. 7, 2013.
Partial International Search Report—PCT/US2013/039652—ISA/EPO—Aug. 8, 2013.

* cited by examiner

*Primary Examiner* — Karabi Guharay
*Assistant Examiner* — Nathaniel Lee
(74) *Attorney, Agent, or Firm* — Edward A. Gordon; Foley & Lardner LLP

(57) ABSTRACT

A display apparatus includes a backlight and an aperture layer that is positioned in front of the backlight and defines a plurality of apertures. The display apparatus also includes a microelectromechanical system (MEMS) light modulator configured to modulate light emitted by the backlight passing through the apertures to form an image on the display apparatus. The MEMS light modulator includes a shutter that has a light blocking portion having an aperture layer-facing surface and a front-facing surface and at least one depression formed in the light blocking portion. The width of the at least one depression accounts for at least 50% but less than 100% of a distance separating two edges of the shutter.

32 Claims, 28 Drawing Sheets

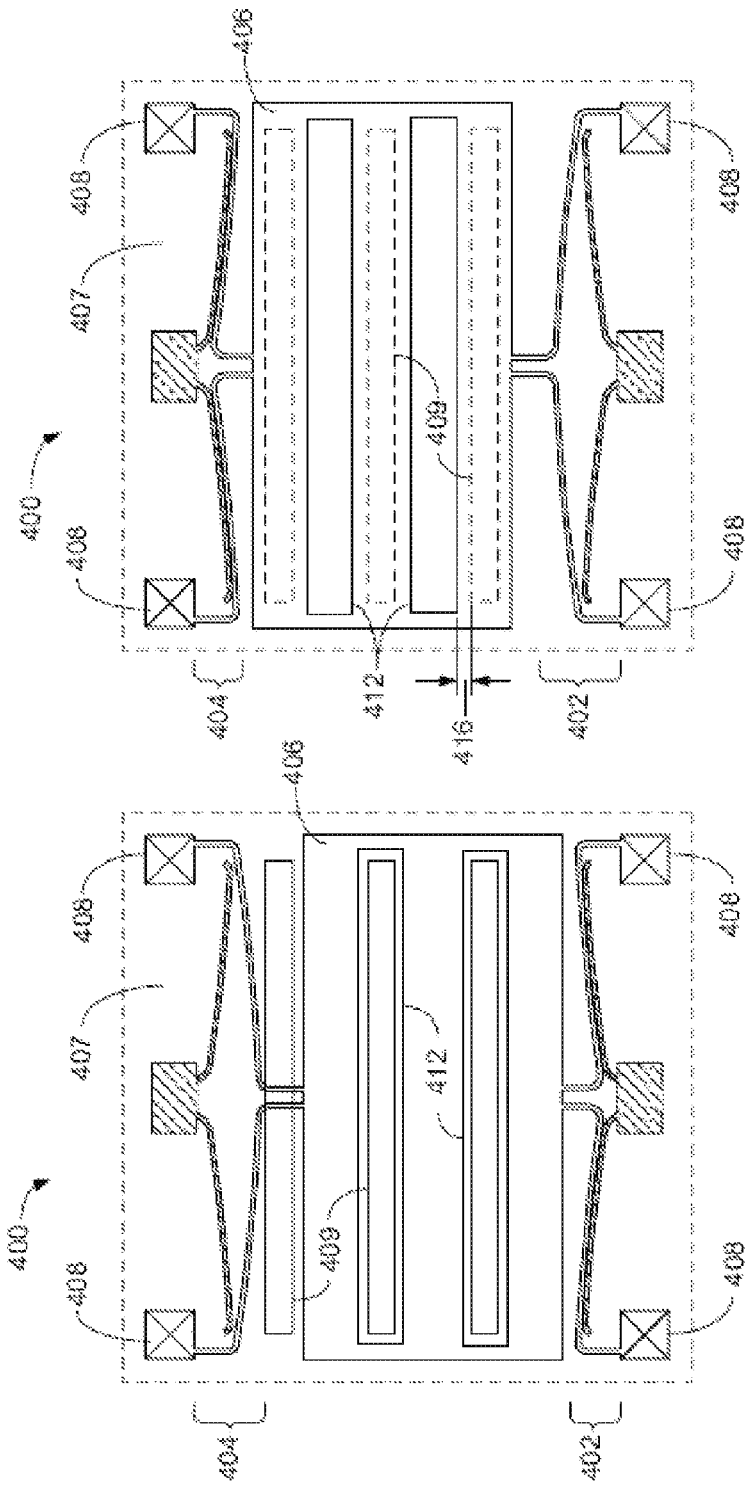
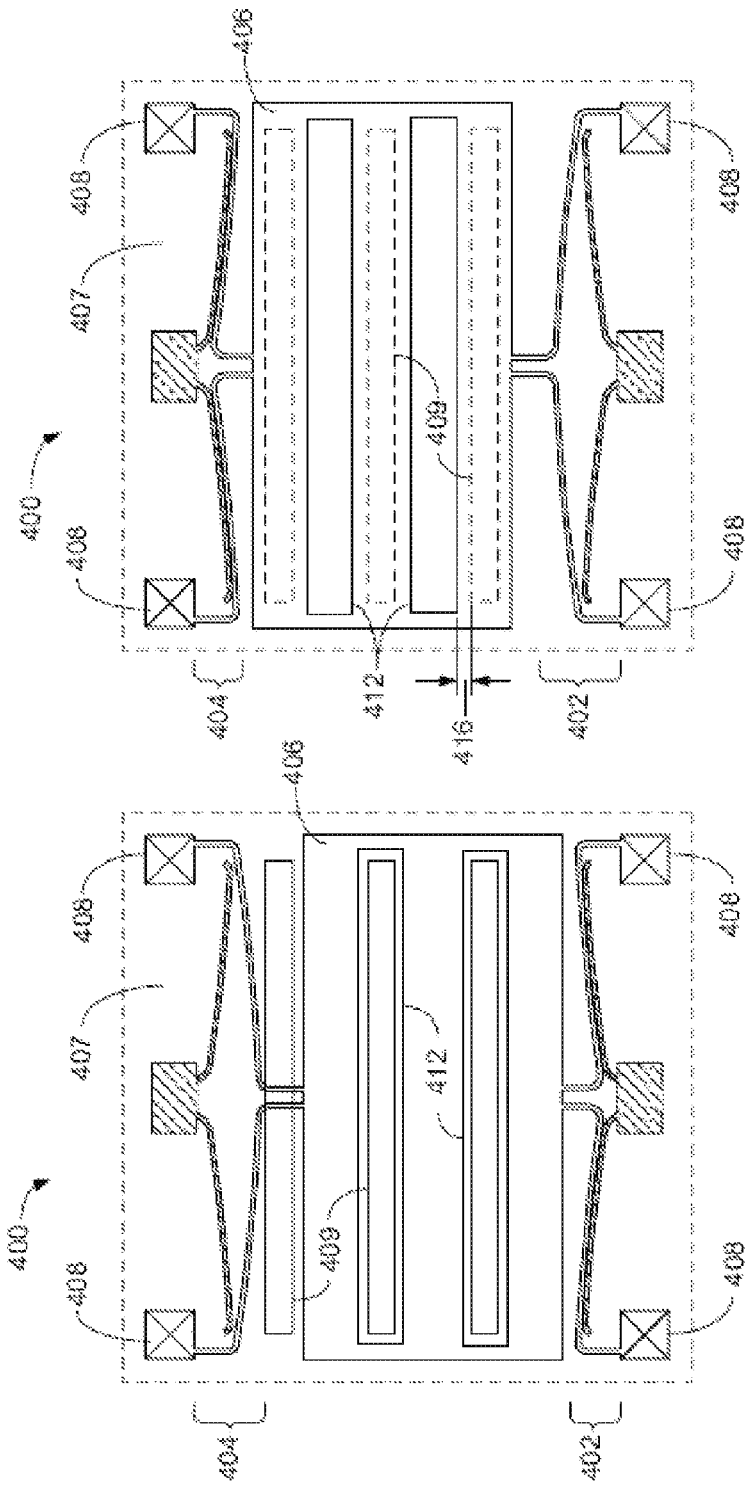
FIGURE 4B
FIGURE 4A
PRIOR ART

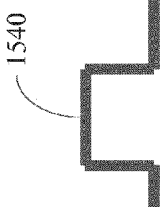
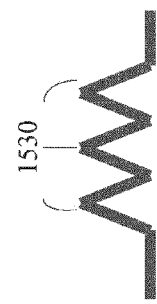
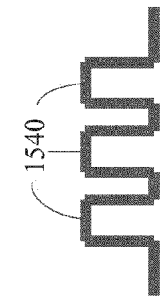
FIGURE 15A
FIGURE 15B
FIGURE 15C
FIGURE 15D
FIGURE 15E
FIGURE 15F
FIGURE 15G
FIGURE 15H
FIGURE 15I

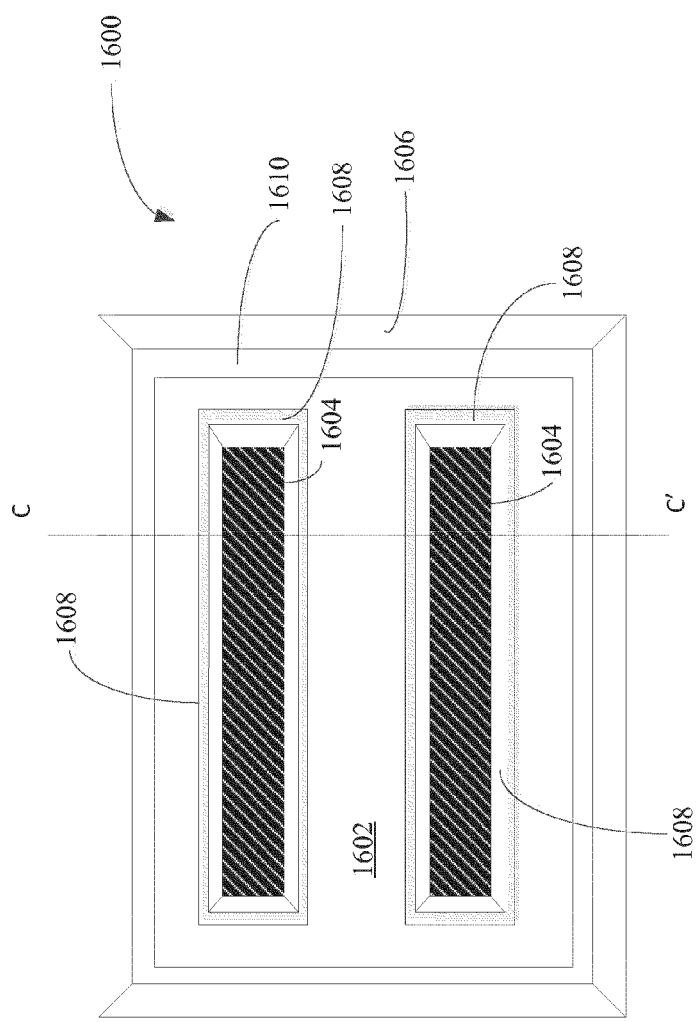
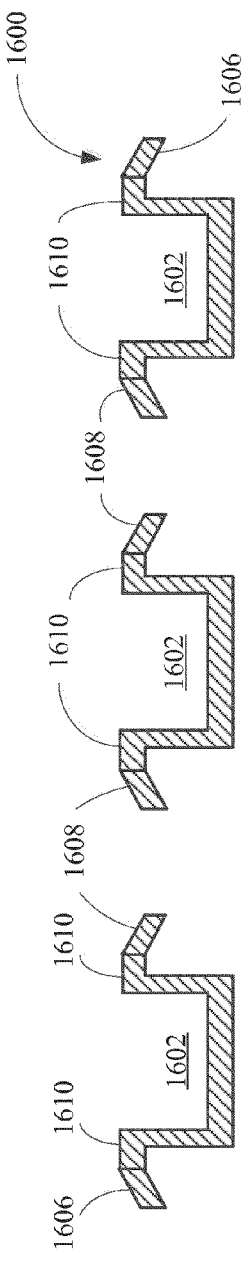
FIGURE 16A
FIGURE 16B

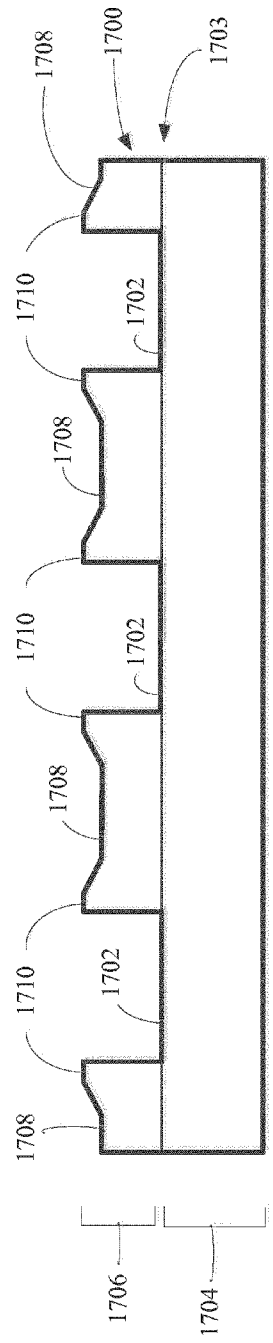
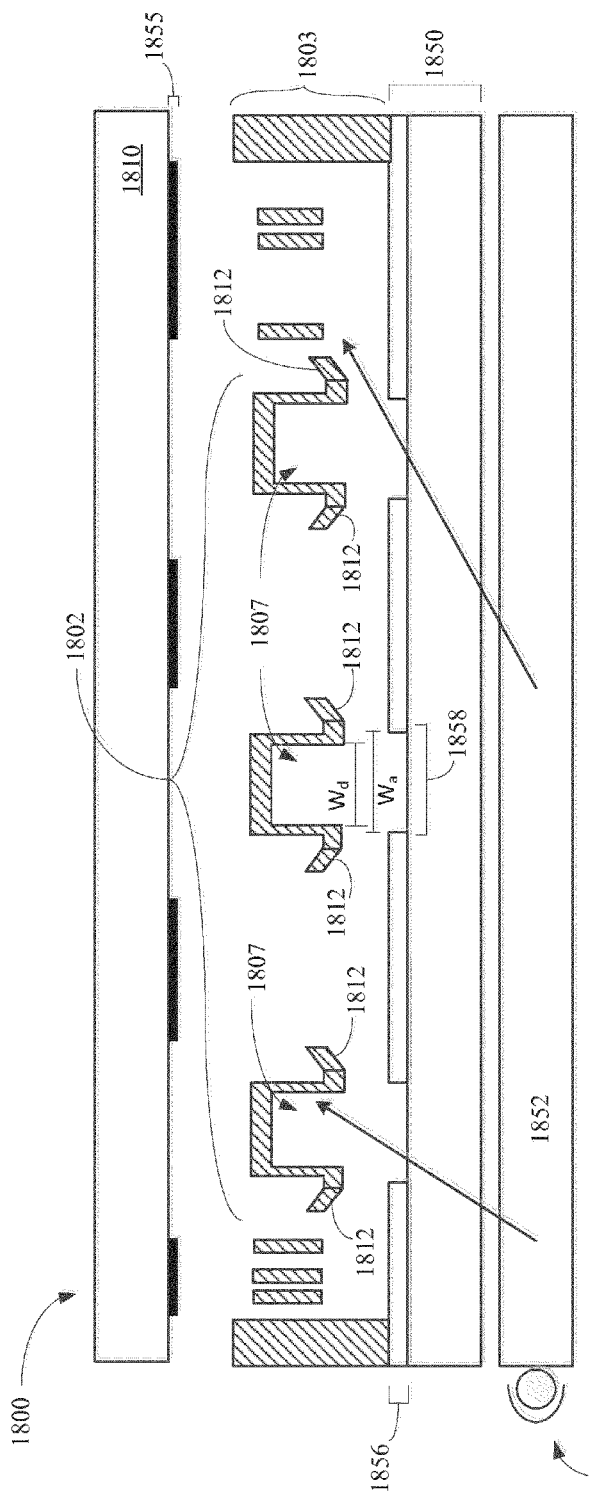
FIGURE 17
FIGURE 18

MICROELECTROMECHANICAL DEVICE AND METHOD OF MANUFACTURING

TECHNICAL FIELD

This disclosure relates to the field of microelectromechanical (MEMS) systems.

DESCRIPTION OF THE RELATED TECHNOLOGY

MEMS have been incorporated in a variety of applications where the mechanical motion of micrometer-sized structures can be utilized to achieve useful functions. An interesting example is displays built from mechanical light modulators which are an attractive alternative to liquid crystal displays. Mechanical light modulators are fast enough to display video content with good viewing angles and with a wide range of color and grey scale.

SUMMARY

The systems, methods and devices of the disclosure each have several innovative aspects, no single one of which is solely responsible for the desirable attributes disclosed herein.

One innovative aspect of the subject matter described in this disclosure can be implemented in a display apparatus having a backlight and an aperture layer that is positioned in front of the backlight and defines a plurality of apertures. The display apparatus also includes at least one MEMS light modulator configured to modulate light emitted by the backlight passing through the apertures to form an image on the display apparatus. The MEMS light modulator includes a shutter that has a light blocking portion having an aperture layer-facing surface and a front-facing surface and at least one depression formed in the light blocking portion. The width of the at least one depression accounts for at least 50% but less than 100% of a distance separating two edges of the shutter. In some implementations, the at least one depression opens towards the aperture layer. In some implementations, the at least one depression has a length, a width, and a depth, such that the width is greater than the depth.

In some implementations, the shutter further includes a shutter aperture for allowing light to pass through the shutter when in an open position and the two edges of the shutter include an outer perimeter edge of the shutter and an edge of the shutter aperture. In some implementations, the shutter includes at least two depressions between the outer perimeter edge of the shutter and the edge of the shutter aperture. In some implementations, the shutter includes a shutter aperture for allowing light to pass through the shutter when in an open position and a side depression positioned between the shutter aperture and a side of the shutter such that the length of the depression is perpendicular to the length of the shutter aperture. In some implementations, the at least one depression includes at least one longitudinal depression portion and at least one lateral depression portion. In some implementations, the shutter includes a perimeter surface having an angle with respect to a display normal that is at least about 20 degrees. In some implementations, the shutter perimeter surface is angled towards the aperture layer. In some implementations, the shutter perimeter surface is angled away from the aperture layer. In some implementations, the angle of the perimeter surface with respect to the display normal is less than about 70 degrees. In some implementations, the at least one depression formed in the light blocking portion is wider than a corresponding aperture in the aperture layer.

Another innovative aspect of the subject matter described in this disclosure can be implemented in a display apparatus having a backlight, an aperture layer that is positioned in front of the backlight and defines a plurality of apertures and at least one MEMS light modulator configured to modulate light emitted by the backlight passing through the apertures to form an image on the display apparatus. The MEMS light modulator includes a shutter that has a light blocking portion having an aperture layer-facing surface and a front-facing surface, a shutter aperture for allowing light to pass through the shutter in an open position and at least one depression formed in the light blocking portion. The at least one depression is positioned between the aperture and a first side of the shutter such that the length of the depression is perpendicular to the length of the shutter aperture. In some implementations, the display apparatus includes at least a second depression positioned between the aperture and a second side of the shutter that is connected to the first side, such that the length of the second depression is parallel to the length of the aperture. In some implementations, the width of the at least one depression takes up at least 50% of the area of the light blocking portion of the shutter. In some implementations, the at least one depression has a length, width, and depth, such that the width is greater than the depth.

In some implementations, the depressions in the light blocking portion of the shutter open toward the aperture layer. In some implementations, the at least one depression includes at least one longitudinal depression portion and at least one lateral depression portion. In some implementations, the at least one depression formed in the light blocking portion is wider than a corresponding aperture in the aperture layer. In some implementations, the shutter includes a perimeter surface that has an angle with respect to a display normal of at least about 20 degrees. In some implementations, the shutter perimeter surface is angled towards the aperture layer. In some implementations, the shutter perimeter surface is angled away from the aperture layer. In some implementations, the angle of the perimeter surface with respect to the display normal is less than about 70 degrees.

Another innovative aspect of the subject matter described in this disclosure can be implemented in a display apparatus that includes a backlight, an aperture layer that is positioned in front of the backlight and defines a plurality of apertures and at least one MEMS light modulator configured to modulate light emitted by the backlight passing through the apertures to form an image on the display apparatus. The MEMS light modulator includes a shutter that has a light blocking portion having an aperture layer-facing surface and a front-facing surface and at least one depression formed in the light blocking portion. The at least one depression is wider than a corresponding aperture in the aperture layer. In some implementations, the at least one depression has a length, a width, and a depth, such that the width is at least greater than the depth.

In some implementations, the at least one depression take up at least 50% of the area of the light blocking portion of the shutter. In some implementations, the at least one depression includes at least one longitudinal depression portion and at least one lateral depression portion. In some implementations, the shutter includes a perimeter surface having an angle with respect to a display normal is at least about 20 degrees. In some implementations, the angle of the perimeter surface with respect to the display normal is less than about 70 degrees.

Another innovative aspect of the subject matter described in this disclosure can be implemented in a display apparatus that includes a backlight, an aperture layer that is positioned in front of the backlight and defines a plurality of apertures and a MEMS light modulator configured to modulate light emitted by the backlight passing through the apertures to form an image on the display apparatus. The MEMS light modulator includes a shutter having a light blocking portion which is predominantly perpendicular to a display normal, and which has at least one perimeter surface angled between 20 degrees and 70 degrees with respect to a display normal.

In some implementations, the shutter includes a shutter aperture having a shutter aperture perimeter, and the at least one perimeter surface includes a surface immediately adjacent the shutter aperture perimeter. In some implementations, the at least one perimeter surface includes a surface immediately adjacent an outer perimeter of the shutter. In some implementations, the at least one perimeter surface is angled towards the aperture layer. In some implementations, the at least one perimeter surface is angled away from the aperture layer.

Details of one or more implementations of the subject matter described in this specification are set forth in the accompanying drawings and the description below. Although the examples provided in this summary are primarily described in terms of MEMS-based displays, the concepts provided herein may apply to other types of displays, such as LCD, OLED, electrophoretic, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4A and 4B show example views of a dual actuator shutter assembly.

FIGS. 15A-15I show example alternative cross sectional shapes suitable for shutter depressions.

FIG. 16A shows a top view of an example shutter having angled perimeter surfaces.

FIG. 16B shows a cross sectional view of the shutter of FIG. 16A.

FIG. 17 shows a cross section of an example mold for forming a shutter with angled perimeter surfaces.

FIG. 18 shows a cross section of an example display apparatus including a shutter having angled perimeter surfaces.

DETAILED DESCRIPTION

Figure 1A:
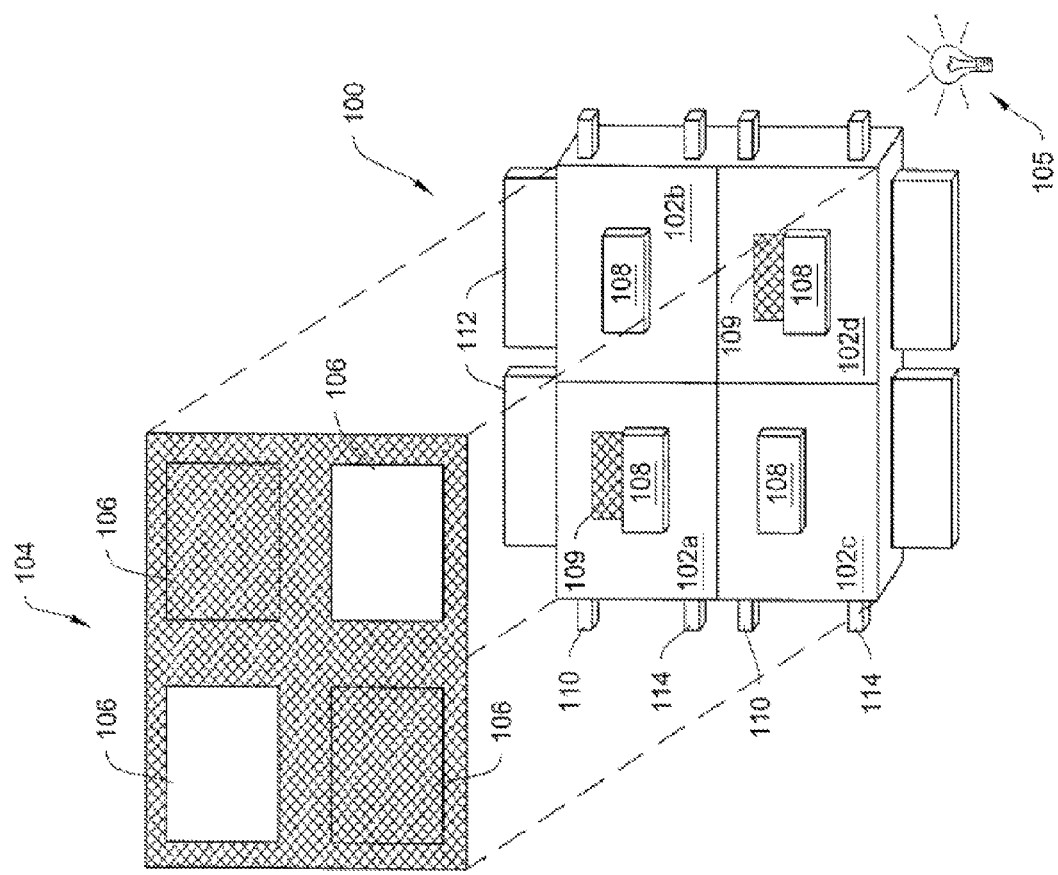
FIG. 1A shows an example schematic diagram of a direct-view microelectromechanical system (MEMS)-based display apparatus.

Certain display apparatus are designed to generate images by modulating light using mechanical shutters. These shutters are supported and actuated by shutter assemblies that, in addition to a shutter, include actuators for actuating the shutter, and anchors for supporting the shutter over a substrate. Such shutters, however, have a tendency to deform out of their desired configuration. This tendency can be combated by incorporating three-dimensional features in the shutter. One example of such a three-dimensional feature is a rib or depression that extends out from the plane of the shutter and opens towards a light emitting aperture.

In addition, some shutter assemblies exhibit the propensity for allowing light to unintentionally escape from an aperture, even while in the closed position. This light leakage can be attributed to three factors. First, light blocked by a light blocking portion of a shutter can reflect off of the shutter, then an off of an underlying aperture layer that emits light from a backlight, and finally out of the display. Second, light is able to leak through the shutter at locations where certain vertical stiffening walls located within a shutter aperture terminate at a neighboring light blocking surface. Third, light passing through an aperture in the aperture layer at a high angle can strike an edge of the shutter and, as a result, refract back towards the display normal and out of the display.

Each of these sources of light leakage can be addressed in part by modifications to the same three-dimensional features that provide the shutter additional rigidity and fight the tendency for the shutter to deform. Light leakage resulting from the above-described reflection phenomenon can be mitigated by a shutter that includes ribs or depressions that are relatively large in relation to the size of the light blocking portion of the shutter and/or the size of the aperture. By using ribs or depressions that run along the length of the shutter, light leakage can be mitigated and shutter rigidity can be increased. Light leakage due to refraction can be mitigated by angling various perimeter surfaces of the shutter such that they are neither parallel nor normal to the display normal.

Particular implementations of the subject matter described in this disclosure can be implemented to realize one or more of the following potential advantages. Inclusion of relatively wide lateral depressions in light blocking portions of a shutter provides for a stiffer shutter that is more likely to retain its desired shape. Such depressions also help prevent light from leaking out of the display from a pixel that is intended to be closed, thereby improving a display's contrast ratio. Depressions along the sides of a shutter similarly help prevent light leakage and provide increased stiffness. Angling perimeter surfaces of shutter can mitigate and in some cases eliminate another source of light leakage, i.e., refraction off of shutter edges, further improving contrast ratio.

FIG. 1A shows a schematic diagram of a direct-view microelectromechanical system (MEMS)-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
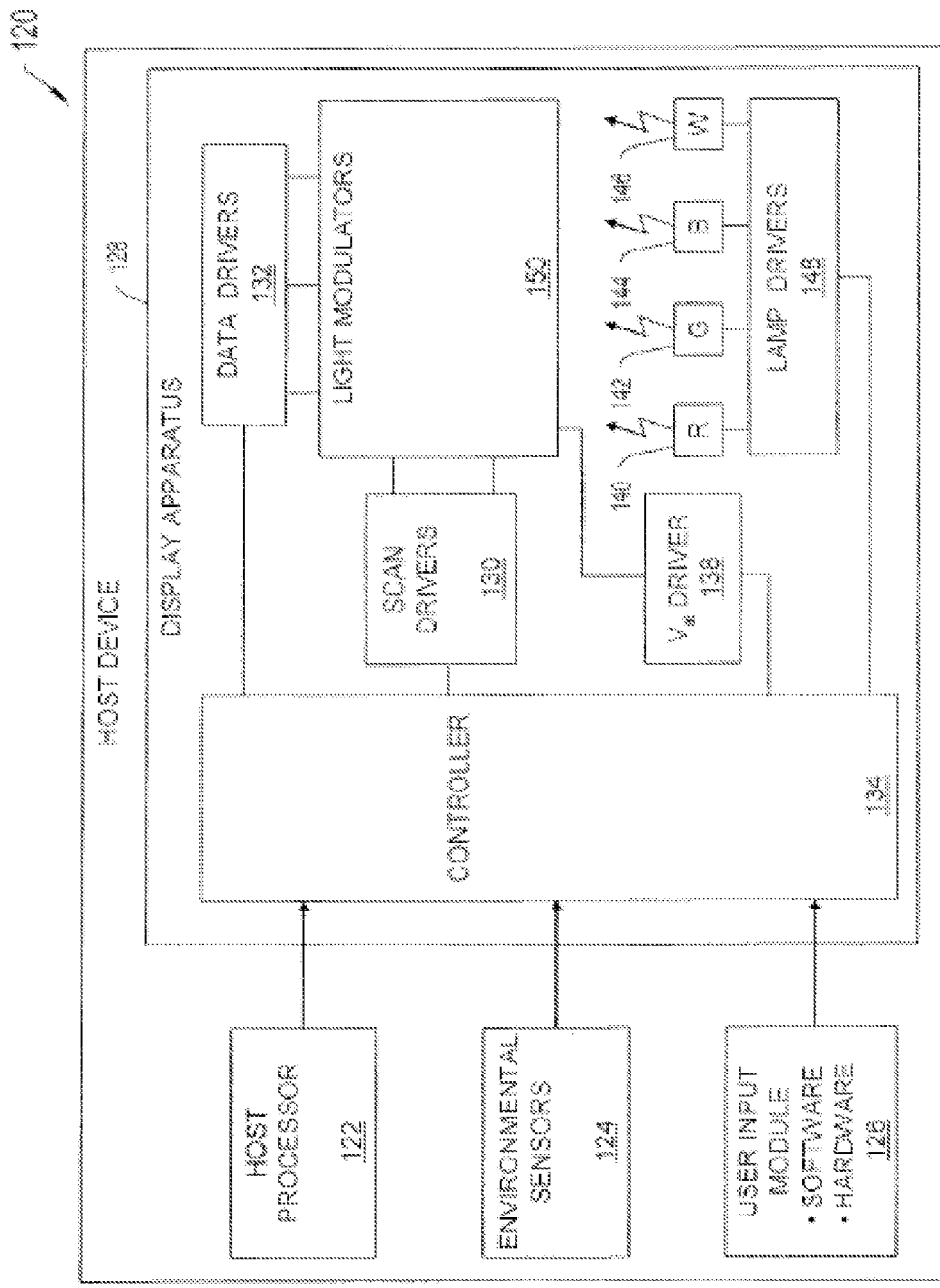
FIG. 1B shows an example block diagram of a host device.

FIG. 1B shows an example of a block diagram 120 of a host device (i.e., cell phone, smart phone, PDA, MP3 player, tablet, e-reader, etc.). The host device includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, and lamp drivers 148. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations, the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor may be a general or special purpose processor for controlling a portable electronic device. With respect to the display apparatus 128, included within the host device 120, the host processor outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device. The environmental sensor module receives data about the ambient environment, such as temperature and or ambient lighting conditions. The sensor module 124 can be programmed to distinguish whether the device is operating in an indoor or office environment versus an outdoor environment in bright daylight versus and outdoor environment at nighttime. The sensor module communicates this information to the display controller 134, so that the controller can optimize the viewing conditions in response to the ambient environment.

Figure 2:
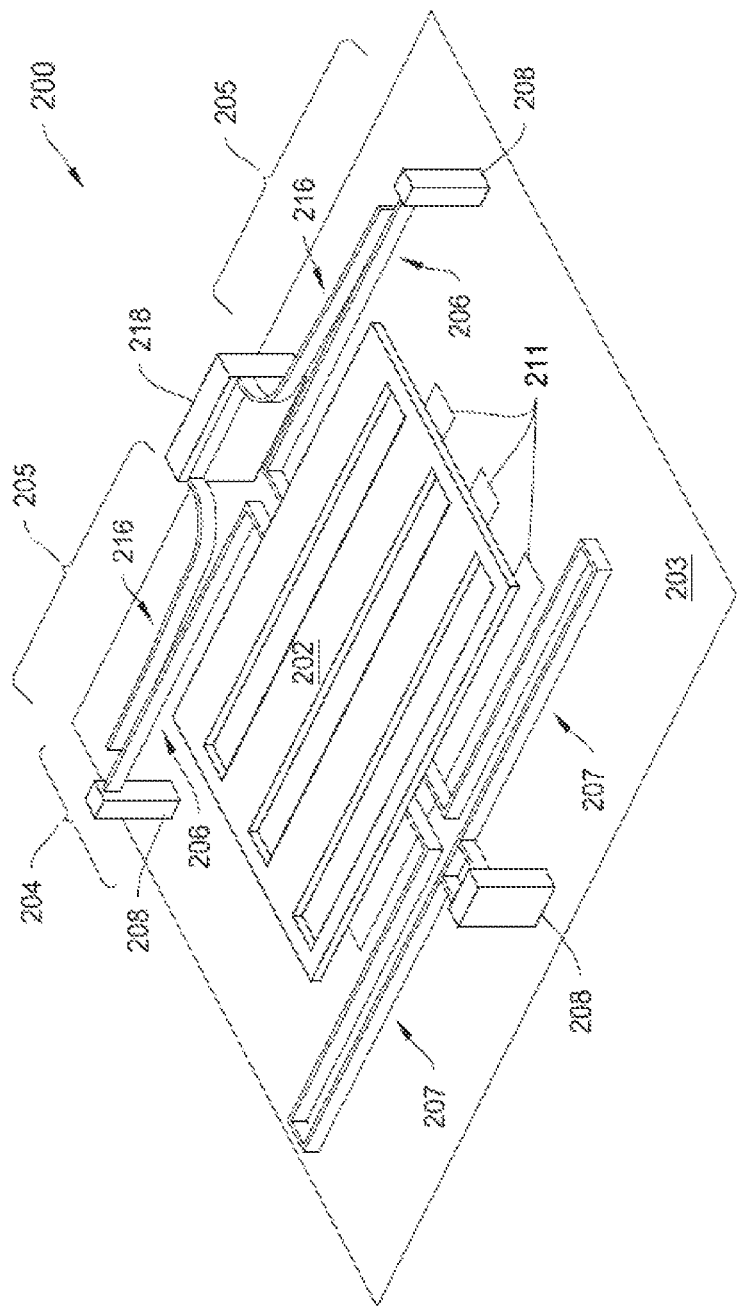
FIG. 2 shows an example perspective view of an illustrative shutter-based light modulator.

FIG. 2 shows a perspective view of an illustrative shutter-based light modulator 200. The shutter-based light modulator is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases, it is appropriate to include switching and/or data storage elements within each pixel of the array (the so-called active matrix) to improve the speed, the luminance level and/or the power dissipation performance of the display.

Figure 3A:
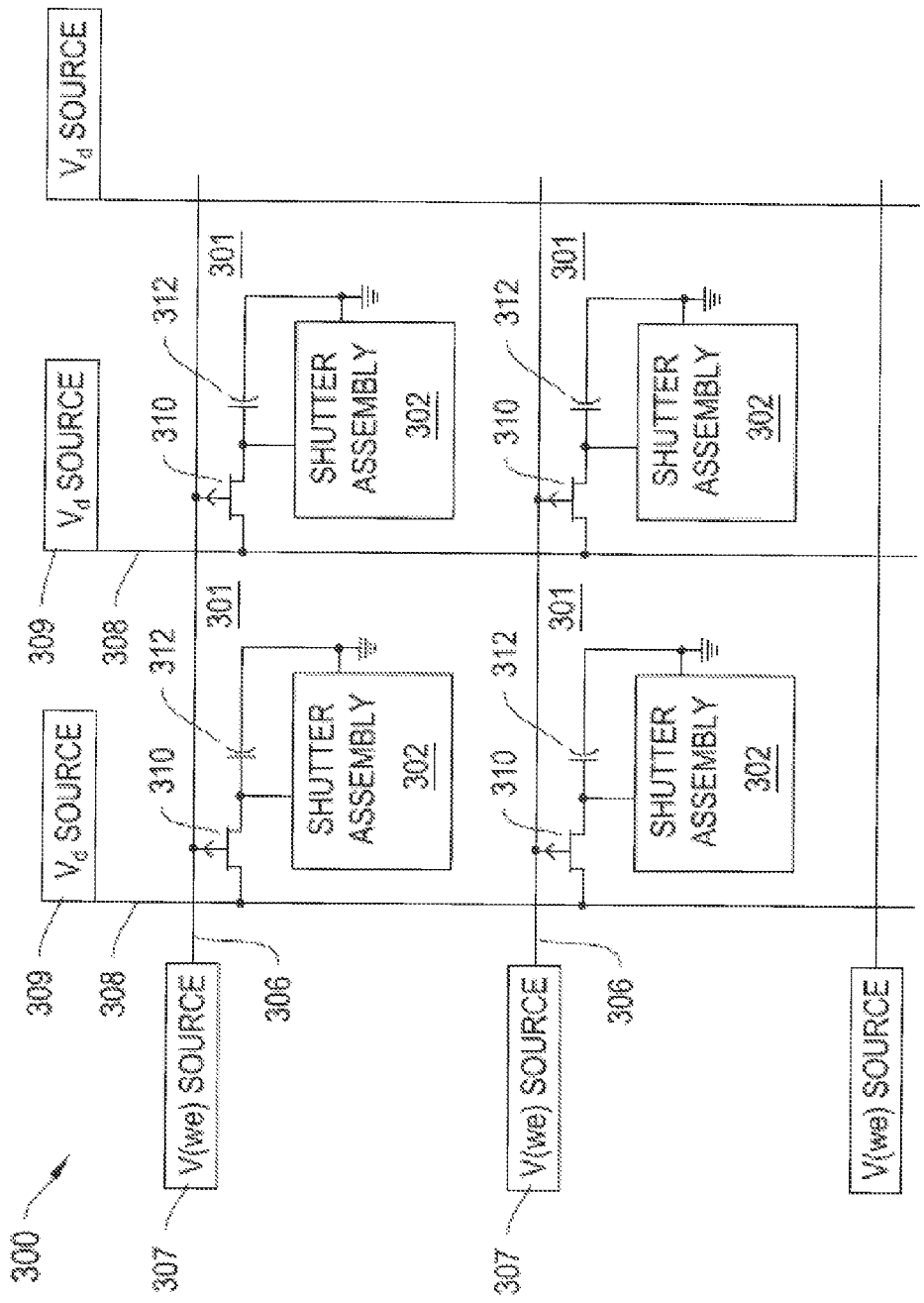
FIG. 3A shows an example schematic diagram of a control matrix.
Figure 3B:
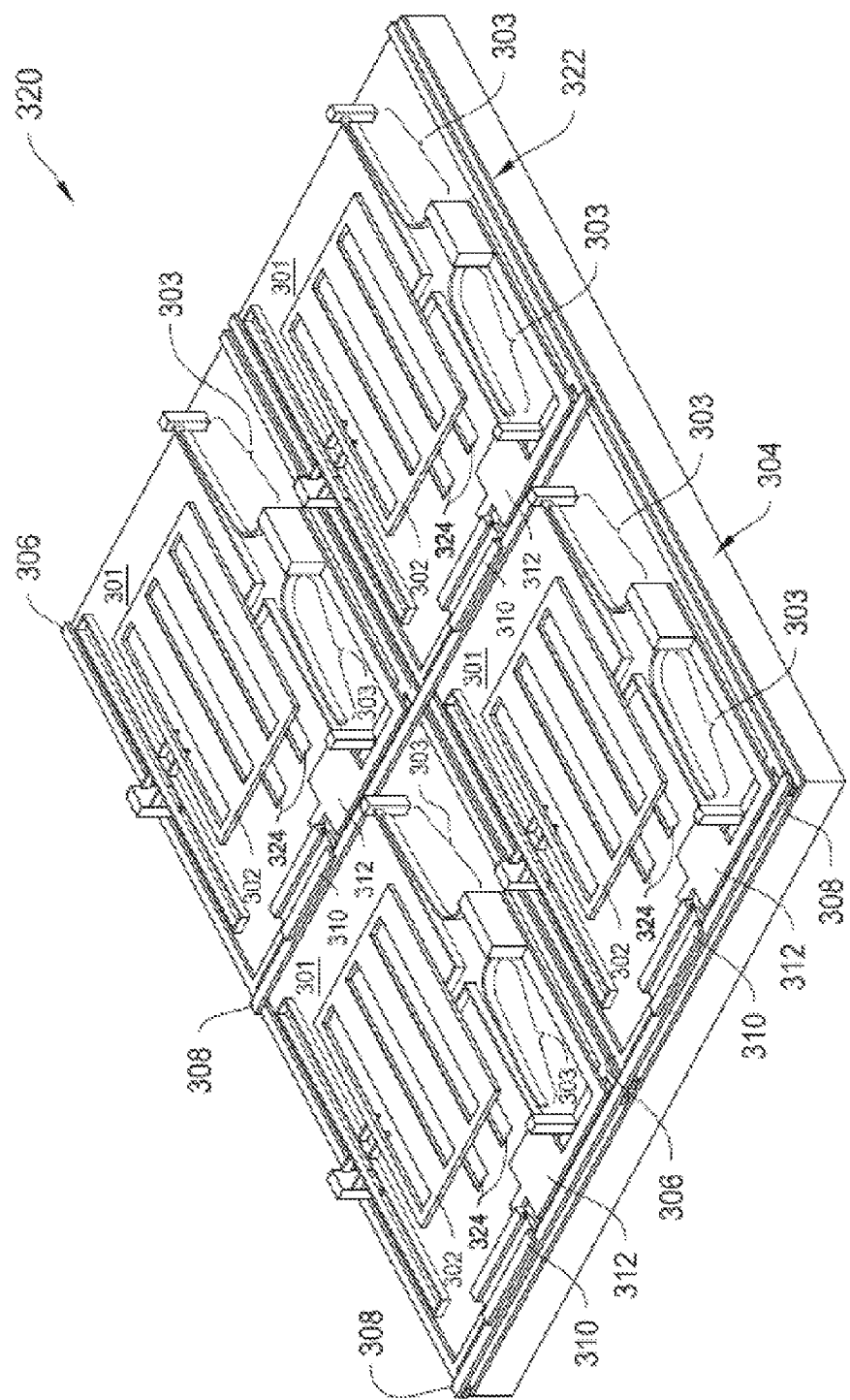
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in the shutter-based light modulator 200 depicted in FIG. 2, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

FIGS. 4A and 4B show example views of a dual actuator shutter assembly 400. The dual actuator shutter assembly, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B, the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
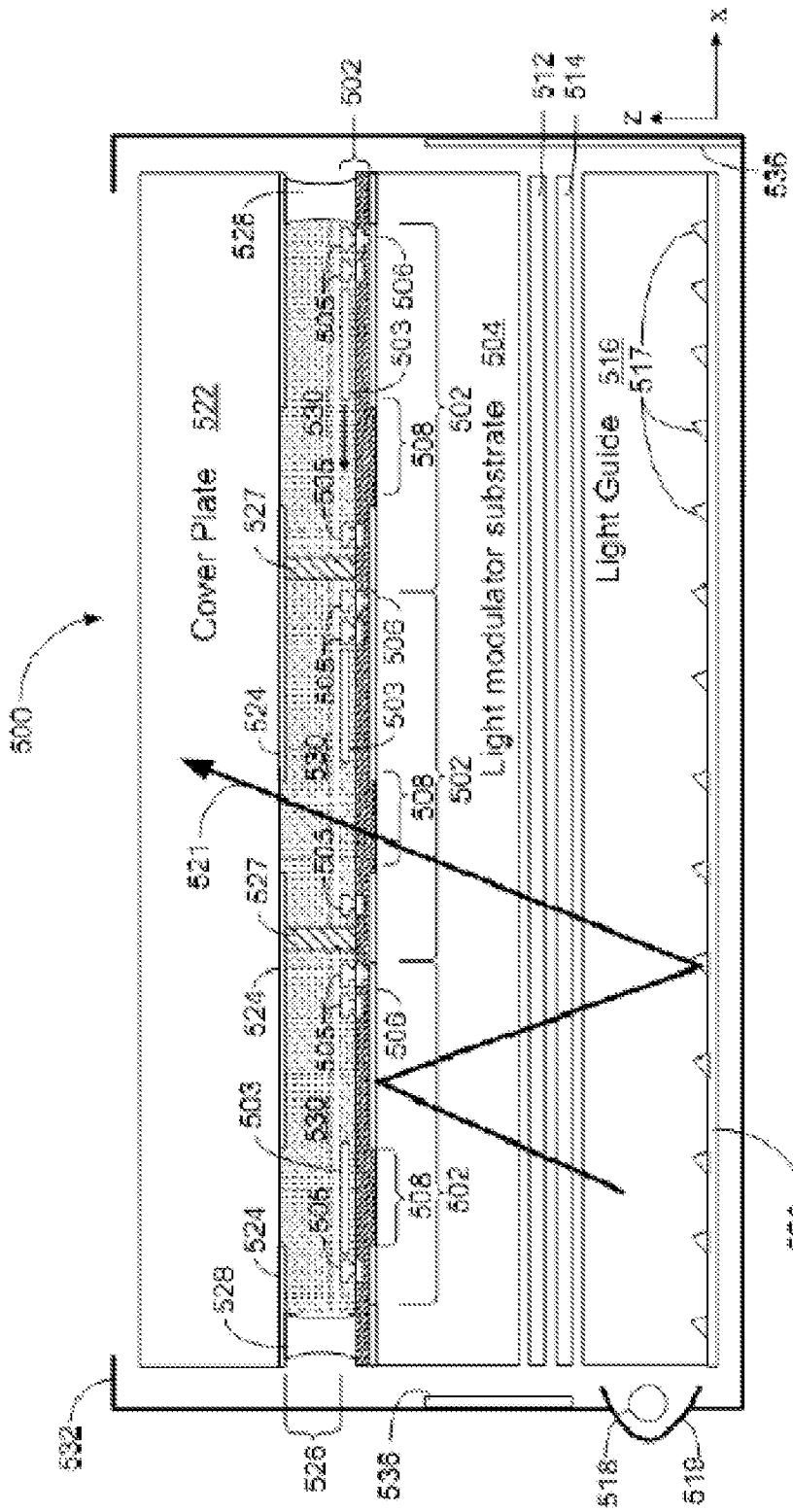
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective aperture layer 506, disposed on the substrate 504 defines a plurality of surface apertures 508 located beneath the closed positions of the shutters 503 of the shutter assemblies 502. The reflective aperture layer 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In some implementations, the reflective aperture layer 506 can be formed from a mirror, such as a dielectric mirror. A dielectric mirror can be fabricated as a stack of dielectric thin films which alternate between materials of high and low refractive index. The vertical gap which separates the shutters 503 from the reflective aperture layer 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide includes a transparent, i.e., glass or plastic material. The light guide 516 is illuminated by one or more light sources 518, forming a backlight 515. The light sources 518 can be, for example, and without limitation, incandescent lamps, fluorescent lamps, lasers or light emitting diodes (LEDs) (generically referred to as "lamps"). A reflector 519 helps direct light from light source 518 towards the light guide 516. A front-facing reflective film 520 is disposed behind the backlight 515, reflecting light towards the shutter assemblies 502. Light rays, such as ray 521 from the backlight 515 that do not pass through one of the shutter assemblies 502, will be returned to the backlight 515 and reflected again from the film 520. In this fashion, light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the light source 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the light source 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light source 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source. For example, if using five colors, the light source may include red, green, blue, cyan and yellow lamps. In some other implementations, the light source 518 may include white, orange, blue, purple and green lamps or white, blue, yellow, red and cyan lamps. If using six colors, the light source may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530) and sealing the fluid (e.g., with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate, dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight 515 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not depicted in FIG. 5 are electrical interconnects which provide control signals as well as power to the shutter assemblies 502 and the light source 518.

The display apparatus 500 is referred to as the MEMS-up configuration, wherein the MEMS based light modulators are formed on a front surface of substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e., the surface that faces away from the viewer and toward the back light 516. The MEMS-based light modulators are thereby positioned directly opposite to and across a gap from the reflective aperture layer 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6A:
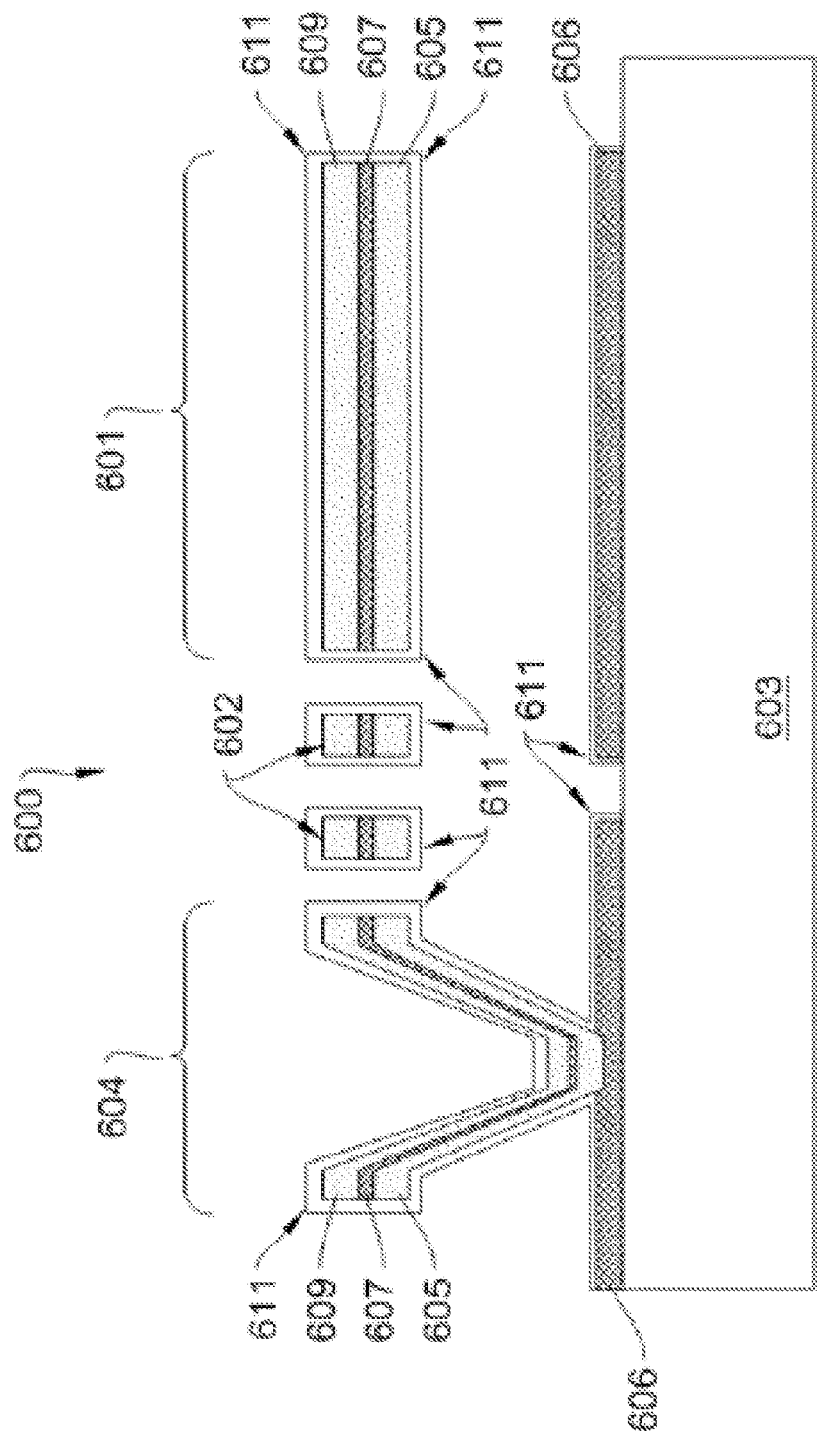
FIGS. 6A-6E show cross sectional views of stages of construction of an example composite shutter assembly.

FIGS. 6A-6E show cross sectional views of stages of construction of an example composite shutter assembly. FIG. 6A shows an example cross sectional diagram of a completed composite shutter assembly 600. The shutter assembly 600 includes a shutter 601, two compliant beams 602, and anchor structure 604 built-up on substrate 603 and an aperture layer 606. The elements of the composite shutter assembly 600 include a first mechanical layer 605, a conductor layer 607, a second mechanical layer 609, and an encapsulating dielectric 611. At least one of the mechanical layers 605 or 609 can be deposited to thicknesses in excess of 0.15 microns, as one or both of the mechanical layers serves as the principle load bearing and mechanical actuation member for the shutter assembly, though in some implementations, the mechanical layers 605 and 609 may be thinner. Candidate materials for the mechanical layers 605 and 609 include, without limitation, metals such as aluminum (Al), copper (Cu), nickel (Ni), chromium (Cr), molybdenum (Mo), titanium (Ti), tantalum (Ta), niobium (Nb), neodymium (Nd), or alloys thereof; dielectric materials such as aluminum oxide ($Al_2O_3$), silicon oxide ($SiO_2$), tantalum pentoxide ($Ta_2O_5$), or silicon nitride ($Si_3N_4$); or semiconducting materials such as diamond-like carbon, silicon (Si), germanium (Ge), gallium arsenide (GaAs), cadmium telluride (CdTe) or alloys thereof. At least one of the layers, such as the conductor layer 607, should be electrically conducting so as to carry charge on to and off of the actuation elements. Candidate materials include, without limitation, Al, Cu, Ni, Cr, Mo, Ti, Ta, Nb, Nd, or alloys thereof or semiconducting materials such as diamond-like carbon, Si, Ge, GaAs, CdTe or alloys thereof. In some implementations employing semiconductor layers, the semiconductors are doped with impurities such as phosphorus (P), arsenic (As), boron (B), or aluminum (Al). FIG. 6A depicts a sandwich configuration for the composite in which the mechanical layers 605 and 609, having similar thicknesses and mechanical properties, are deposited on either side of the conductor layer 607. In some implementations, the sandwich structure helps to ensure that stresses remaining after deposition and/or stresses that are imposed by temperature variations will not act cause bending, warping or other deformation of the shutter assembly 600.

In some implementations the order of the layers in the composite shutter assembly 600 can be inverted, such that the outside of the shutter is formed from a conducting layer while the inside of the shutter is formed from a mechanical layer.

The shutter assembly 600 can include an encapsulating dielectric 611. In some implementations, dielectric coatings can be applied in conformal fashion, such that all bottom, tops, and side surfaces of the shutters and beams are uniformly coated. Such thin films can be grown by thermal oxidation and/or by conformal chemical vapor deposition of an insulator such as aluminum oxide ($Al_2O_3$), chromium (III) oxide ($Cr_2O_3$), titanium oxide ($TiO_2$), hafnium oxide ($HfO_2$), vanadium oxide ($V_2O_5$), niobium oxide ($Nb_2O_5$), tantalum pentoxide ($Ta_2O_5$), silicon oxide ($SiO_2$), or silicon nitride ($Si_3N_4$), or by depositing similar materials via atomic layer deposition. The dielectric coating layer can be applied with thicknesses in the range of 10 nm to 1 micron. In some implementations, sputtering and evaporation can be used to deposit the dielectric coating onto sidewalls.

FIGS. 6B-6E show example cross-sectional views of the results of the certain intermediate manufacturing steps of an example process used to form the shutter assembly 600 depicted in FIG. 6. In some implementations, the shutter assembly 600 is built on top of a pre-existing control matrix, such as an active matrix array of thin film transistors, such as the control matrices depicted in FIGS. 3A and 3B.

Figure 6B:
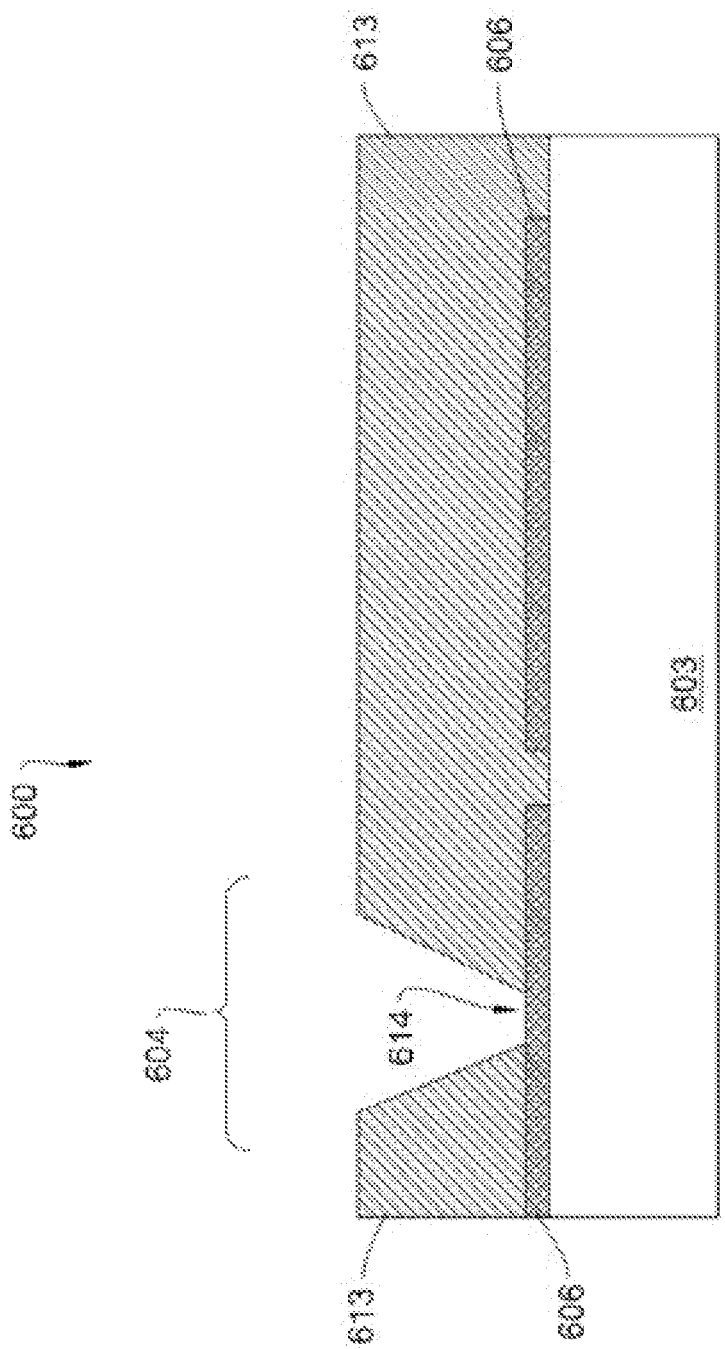

FIG. 6B shows a cross sectional view of the results of a first stage in an example process of forming the shutter assembly 600. As shown in FIG. 6B, a sacrificial layer 613 is deposited and patterned. In some implementations, polyimide is used as the sacrificial material. Other candidate sacrificial materials include polymer materials such as polyamide, fluoropolymer, benzocyclobutene, polyphenylquinoxylene, parylene, or polynorbornene. These materials are chosen for their ability to planarize rough surfaces, maintain mechanical integrity at processing temperatures in excess of 250 C, and their ease of etch and/or thermal decomposition during removal. In other implementations, the sacrificial layer 613 is formed from a photoresist, such as polyvinyl acetate, polyvinyl ethylene, and phenolic or novolac resins. An alternate sacrificial layer material used in some implementations is $SiO_2$, which can be removed preferentially as long as other electronic or structural layers are resistant to the hydrofluoric acid solutions used for its removal. One such suitably resistant material is $Si_3N_4$. Another alternate sacrificial layer material is Si, which can be removed preferentially as long as other electronic and structural layers are resistant to the fluorine plasmas or xenon difluoride ($XeF_2$) used for its removal, such as most metals and $Si_3N_4$. Yet another alternate sacrificial layer material is Al, which can be removed preferentially as long as other electronic or structural layers are resistant to strong base solutions, such as concentrated sodium hydroxide (NaOH) solutions. Suitable materials include, for example, Cr, Ni, Mo, Ta and Si. Still another alternate sacrificial layer material is Cu, which can be removed preferentially as long as other electronic or structural layers are resistant to nitric or sulfuric acid solutions. Such materials include, for example, Cr, Ni, and Si.

Next the sacrificial layer 613 is patterned to expose holes or vias at the anchor regions 604. In implementations employing polyimide or other non-photoactive materials as the sacrificial layer material, the sacrificial layer material can be formulated to include photoactive agents—enabling regions exposed through a UV photomask to be preferentially removed in a developer solution. Sacrificial layers formed from other materials can be patterned by coating the sacrificial layer 613 in an additional layer of photoresist, photopatterning the photoresist, and finally using the photoresist as an etching mask. The sacrificial layer 613 can alternatively be patterned by coating the sacrificial layer with a hard mask, which can be a thin layer of $SiO_2$ or metal such as Cr. A photopattern is then transferred to the hard mask by means of photoresist and wet chemical etching. The pattern developed in the hard mask can be very resistant to dry chemical, anisotropic, or plasma etching techniques which can be used to impart very deep and narrow anchor holes into the sacrificial layer 613.

After the anchor regions 604 have been opened in the sacrificial layer 613, the exposed and underlying conducting surface 614 can be etched, either chemically or via the sputtering effects of a plasma, to remove any surface oxide layers. Such a contact etching stage can improve the ohmic contact between the underlying conductor and the shutter material. After patterning of the sacrificial layer, any photoresist layers or hard masks can be removed through use of either solvent cleans or acid etching.

Figure 6C:
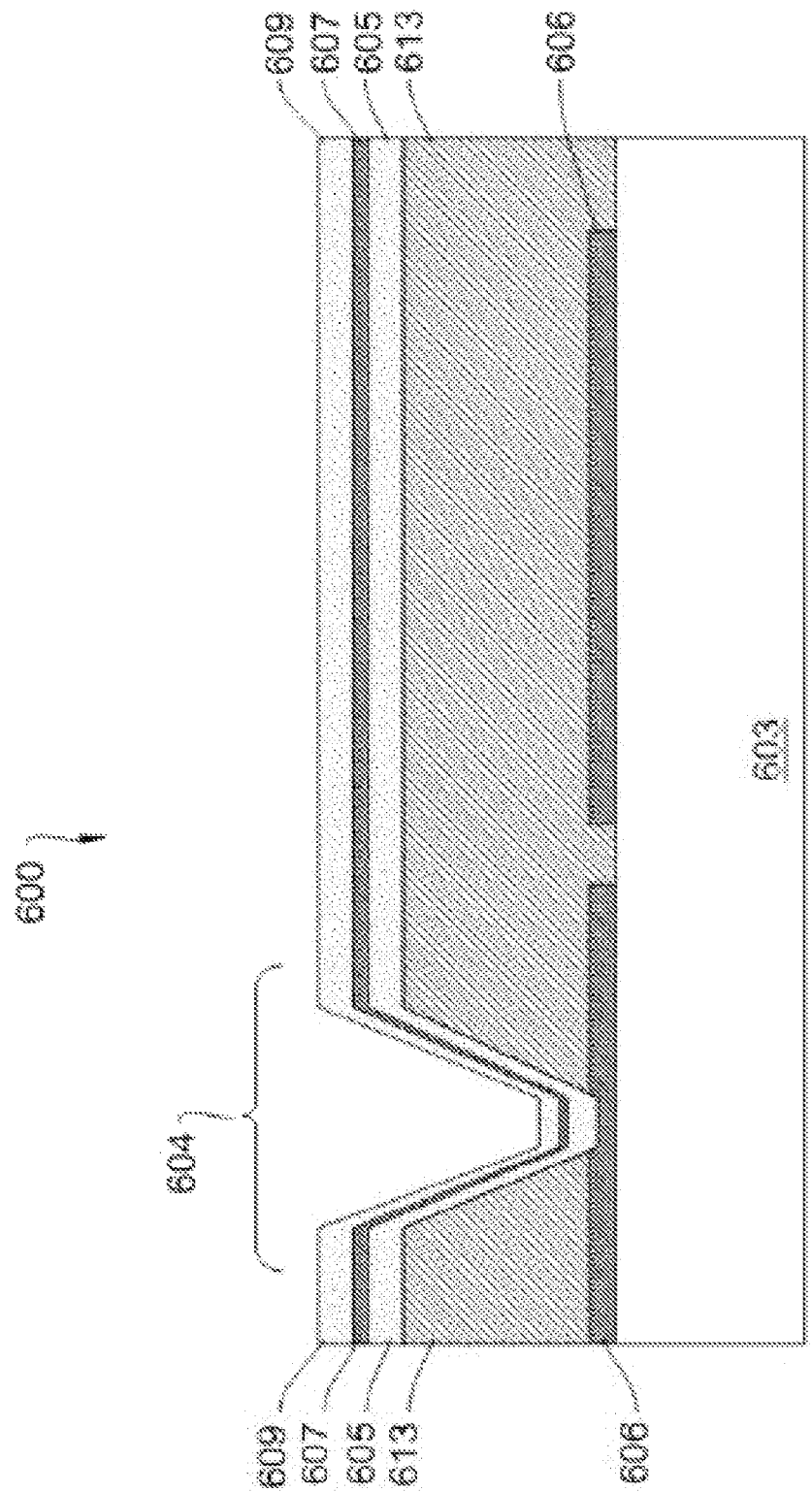

Next, in the process for building shutter assembly 600, as depicted in FIG. 6C, the shutter materials are deposited. The shutter assembly 600 is composed of multiple thin films: the first mechanical layer 605, the conductor layer 607 and the second mechanical layer 609. In some implementations, the first mechanical layer 605 is an amorphous silicon (a-Si) layer, the conductor layer 607 is Al and the second mechanical layer 609 is a-Si. The first mechanical layer 605, the conductor layer 607 and the second mechanical layer 609 are deposited at a temperature below which physical degradation occurs for the sacrificial layer 613. For instance, polyimide decomposes at temperatures above 400 C. Therefore, in some implementations, the first mechanical layer 605, the conductor layer 607 and the second mechanical layer 609 are deposited at temperatures below 400 C, allowing usage of polyimide as a sacrificial material. In some implementations, hydrogenated amorphous silicon (a-Si:H) is a useful mechanical material for the first and second mechanical layers 605 and 609 since it can be grown to thicknesses in the range of about 0.15 to 3 microns, in a relatively stress-free state, by means of plasma-assisted chemical vapor deposition (PECVD) from silane gas at temperatures in the range of about 250 to 350 C. In some of such implementations, phosphene gas (PH3) is used as a dopant so that the a-Si can be grown with resistivities below about 1 ohm-cm. In alternate implementations, a similar PECVD technique can be used for the deposition of $Si_3N_4$, silicon-rich $Si_3N_4$, or $SiO_2$ materials as the first mechanical layer 605 or for the deposition of diamond-like carbon, Ge, SiGe, CdTe, or other semiconducting materials for first mechanical layer 605. An advantage of the PECVD deposition technique is that the deposition can be quite conformal, that is, it can coat a variety of inclined surfaces or the inside surfaces of narrow via holes. Even if the anchor or via holes which are cut into the sacrificial material present nearly vertical sidewalls, the PECVD technique can provide a continuous coating between the bottom and top horizontal surfaces of the anchor.

In addition to the PECVD technique, alternate suitable techniques available for the growth of the first and second mechanical layers 605 and 609 include RF or DC sputtering, metal-organic chemical vapor deposition, evaporation, electroplating or electroless plating.

For the conducting layer 607, in some implementations, a metal thin film, such as Al, is utilized. In some other implementations, alternative metals, such as Cu, Ni, Mo, or Ta can be chosen. The inclusion of such a conducting material serves two purposes. It reduces the overall sheet resistance of the shutter 601, and it helps to block the passage of visible light through the shutter 601, since a-Si, if less than 2 microns thick, as may be used in some implementations of the shutter, can transmit visible light to some degree. The conducting material can be deposited either by sputtering or, in a more conformal fashion, by chemical vapor deposition techniques, electroplating, or electroless plating.

Figure 6D:
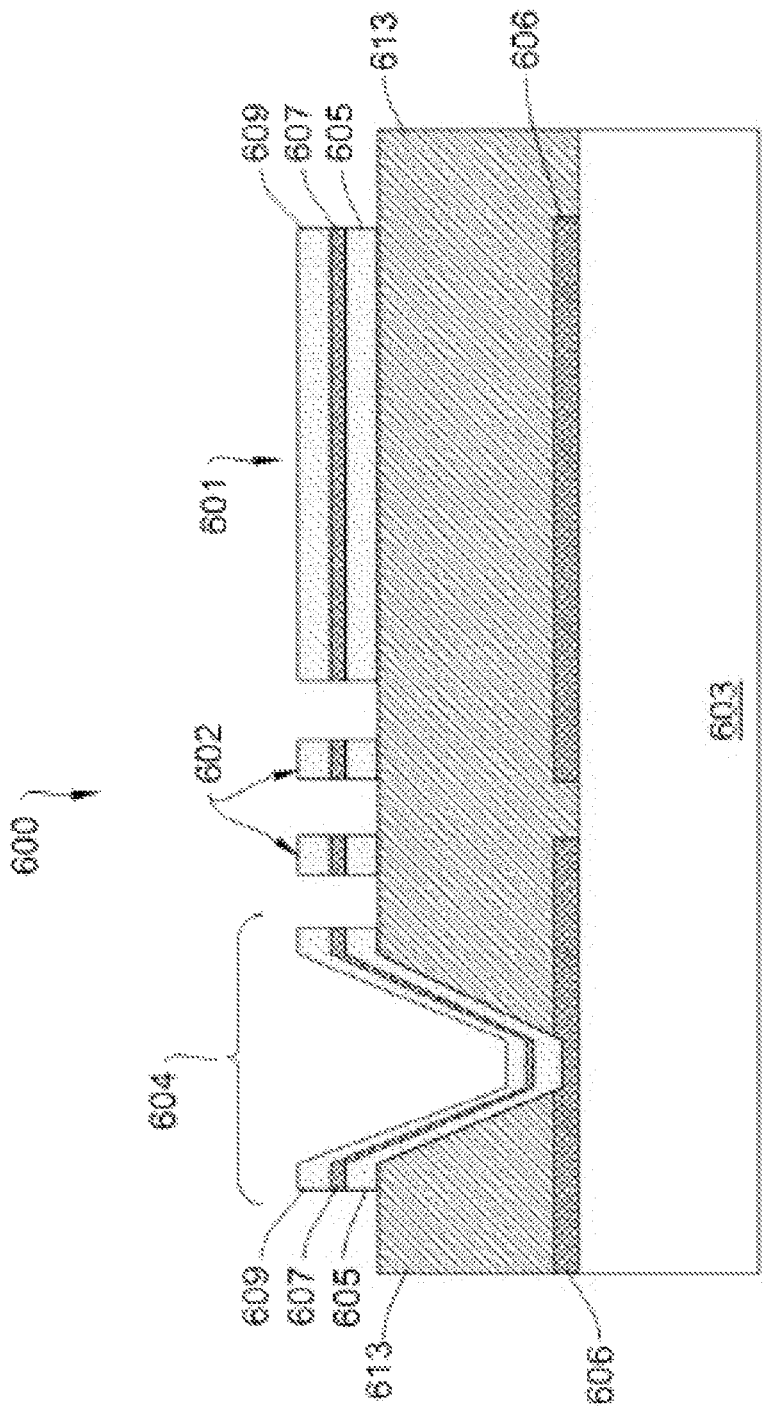

FIG. 6D shows the results of the next set of processing stages used in the formation of the shutter assembly 600. The first mechanical layer 605, the conductive layer 607, and the second mechanical layer 609 are photomasked and etched while the sacrificial layer 613 is still on the substrate 603. First, a photoresist material is applied, then exposed through a photomask, and then developed to form an etch mask. Amorphous silicon, $Si_3N_4$, and SiO can then be etched in fluorine-based plasma chemistries. $SiO_2$ mechanical layers can be etched using HF wet chemicals; and any metals in the conductive layer 607 can be etched with either wet chemicals or chlorine-based plasma chemistries.

The pattern shapes applied through the photomask influence the mechanical properties, such as stiffness, compliance, and the voltage response in the actuator and shutter 601 of the shutter assembly 600. The shutter assembly 600 includes a compliant beam 602, shown in cross section. The compliant beam 602 is shaped such that the width is less than the total height or thickness of the shutter material. In some implementations, the beam dimensional ratio is maintained at 1.4:1 or greater, with the compliant beams 602 being taller or thicker than they are wide.

Figure 6E:
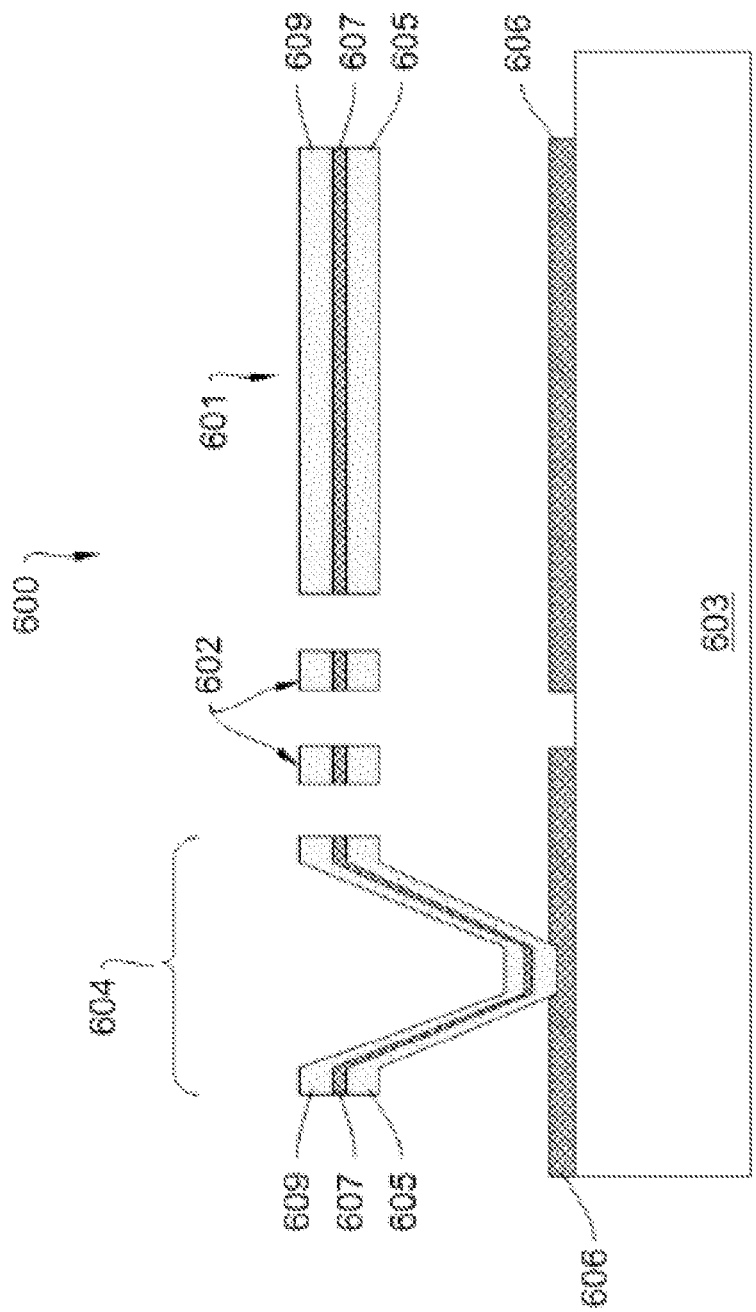

The results of subsequent stages of the example manufacturing process for building the shutter assembly 600 are depicted in FIG. 6E. The sacrificial layer 613 is removed, which frees-up all moving parts from the substrate 603, except at the anchor points. In some implementations, polyimide sacrificial materials are removed in an oxygen plasma. Other polymer materials used for the sacrificial layer 613 also can be removed in an oxygen plasma, or in some cases by thermal pyrolysis. Some sacrificial layer materials (such as $SiO_2$) can be removed by wet chemical etching or by vapor phase etching.

In a final process, the results of which are depicted in FIG. 6A, an encapsulating dielectric 611 is deposited on all exposed surfaces of the shutter 601. In some implementations, the encapsulating dielectric 611 can be applied in conformal fashion, such that all bottom, tops, and side surfaces of the shutter 601 and beams 602 are uniformly coated using chemical vapor deposition. In some other implementations, only the top and side surfaces of the shutter are coated. In some implementations, $Al_2O_3$ is used for the encapsulating dielectric 611 and is deposited by atomic layer deposition to thicknesses in the range of 10 to 100 nanometers.

Finally, anti-stiction coatings can be applied to the surfaces of the shutter 601 and beams 602. These coatings prevent the unwanted stickiness or adhesion between two independent beams of an actuator. Suitable coatings include carbon films (both graphite and diamond-like) as well as fluoropolymers, and/or low vapor pressure lubricants, as well as chlorosilanes, hydrocarbon chlorosilanes, fluorocarbon chlorosilanes, such as methoxy-terminated silanes, perfluoronated, amino-silanes, siloxanes and carbonxylic acid based monomers and species. These coatings can be applied by either exposure to a molecular vapor or by decomposition of a precursor compounds by means of chemical vapor deposition. Anti-stiction coatings also can be created by the chemical alteration of shutter surfaces, such as by fluoridation, silanization, sioxidation, or hydrogenation of insulating surfaces.

One class of suitable actuators for use in MEMS-based shutter displays include compliant actuator beams for controlling shutter motion that is transverse to or in-the-plane of the display substrate. The voltage employed for the actuation of such shutter assemblies decreases as the actuator beams become more compliant. The control of actuated motion also improves if the beams are shaped such that in-plane motion is preferred or promoted with respect to out-of-plane motion. Thus, in some implementations, the compliant actuator beams have a rectangular cross section, such that the beams are taller or thicker than they are wide.

The stiffness of a long rectangular beam with respect to bending within a particular plane scales with the thinnest dimension of that beam in that plane to the third power. It is therefore advantageous to reduce the width of the compliant beams to reduce the actuation voltages for in-plane motion. When using conventional photolithography equipment to define and fabricate the shutter and actuator structures, however, the minimum width of the beams can be limited to the resolution of the optics. And although photolithography equipment has been developed for defining patterns in photoresist with features as narrow as 15 nanometers, such equipment is expensive and the areas over which patterning can be accomplished in a single exposure are limited. For economical photolithography over large panels of glass, the patterning resolution or minimum feature size is typically limited to 1 micron or 2 microns or greater.

FIGS. 7A-7D show isometric views of stages of construction of an example shutter assembly 700 with narrow sidewall beams. This alternate process yields compliant actuator beams 718 and 720 and a compliant spring beam 716 (collectively referred to as "sidewall beams 716, 718, and 720"), which have a width well below the conventional lithography limits on large glass panels. In the process depicted in FIGS. 7A-7D, the compliant beams of shutter assembly 700 are formed as sidewall features on a mold made from a sacrificial material. The process is referred to as a sidewall beams process.

Figure 7A:
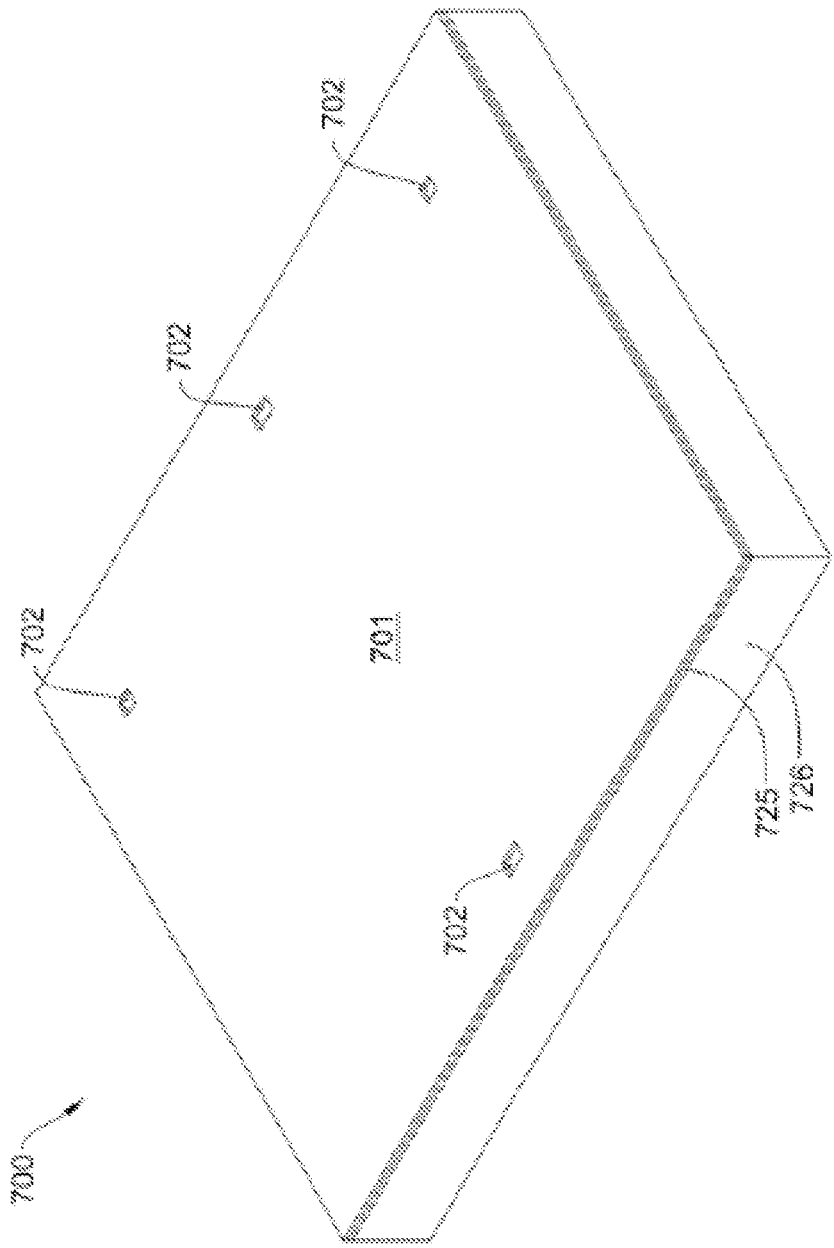
FIGS. 7A-7D show isometric views of stages of construction of an example shutter assembly with narrow sidewall beams.

The process of forming a shutter assembly 700 with sidewall beams 716, 718, and 720 begins, as shown in FIG. 7A, with the deposition and patterning of a first sacrificial material 701. The pattern defined in the first sacrificial material creates openings or vias 702 within which anchors for the shutter will eventually be formed. The deposition and patterning of the first sacrificial material 701 is similar in concept, and uses similar materials, as those described for the deposition and patterning described in relation to FIGS. 6A-6E.

Figure 7B:
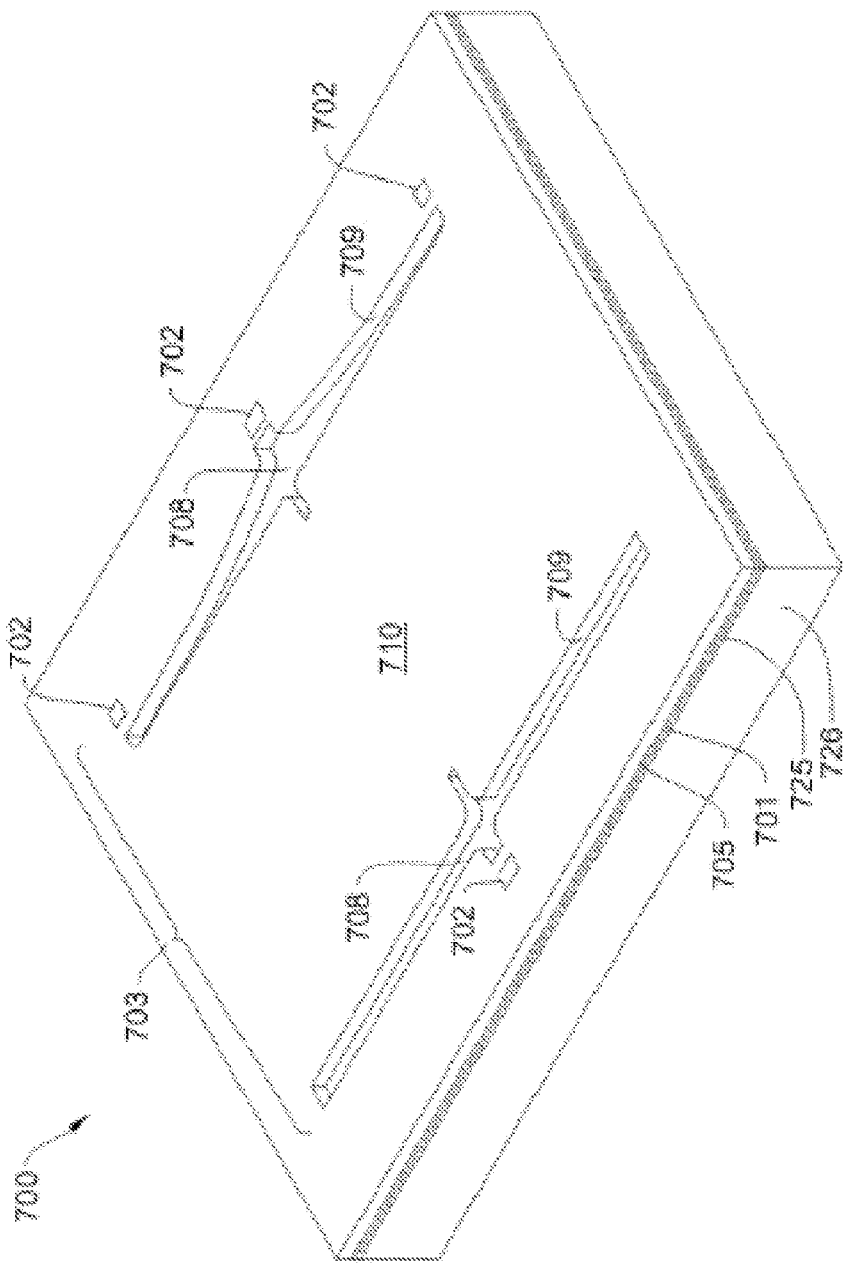

The process of forming the sidewall beams 716, 718 and 720 continues with the deposition and patterning of a second sacrificial material 705. FIG. 7B shows the shape of a mold 703 that is created after patterning of the second sacrificial material 705. The mold 703 also includes the first sacrificial material 701 with its previously defined vias 702. The mold 703 in FIG. 7B includes two distinct horizontal levels: The bottom horizontal level 708 of the mold 703 is established by the top surface of the first sacrificial layer 701 and is accessible in those areas where the second sacrificial layer 705 has been etched away. The top horizontal level 710 of the mold 703 is established by the top surface of the second sacrificial layer 705. The mold 703 depicted in FIG. 7B also includes substantially vertical sidewalls 709.

Materials for use as the first and second sacrificial layers 701 and 705 are described above with respect to sacrificial layer 613 of FIGS. 6A-6E.

Figure 7C:
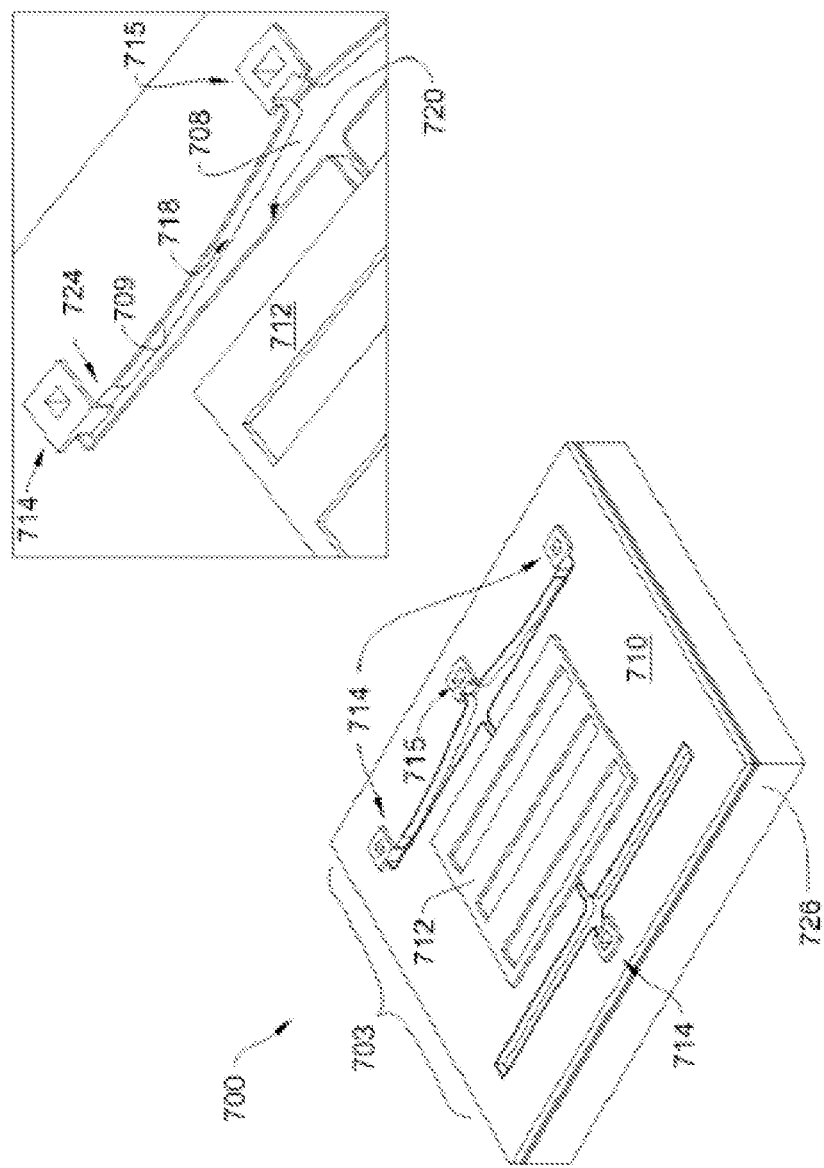

The process of forming the sidewall beams 716, 718 and 720 continues with the deposition and patterning of shutter material onto all of the exposed surfaces of the mold 703, as depicted in FIG. 7C. Suitable materials for use in forming the shutter 712 are described above with respect to the first mechanical layer 605, the conductive layer 607, and the second mechanical layer 609 of FIGS. 6A-6E. The shutter material is deposited to a thickness of less than about 2 microns. In some implementations, the shutter material is deposited to have a thickness of less than about 1.5 microns. In some other implementations, the shutter mater is deposited to have a thickness of less than about 1.0 microns, and as thin as about 0.10 microns. After deposition, the shutter material (which may be a composite of several materials as described above) is patterned, as depicted in FIG. 7C. First, a photoresist mask is deposited on the shutter material. The photoresist is then patterned. The pattern developed into the photoresist is designed such that shutter material, after a subsequent etch stage, remains in the region of shutter 712 as well as at the anchors 714.

The manufacturing process continues with applying an anisotropic etch, resulting in the structure depicted in FIG. 7C. The anisotropic etch of the shutter material is carried out in a plasma atmosphere with a voltage bias applied to the substrate, or to an electrode in proximity to the substrate. The biased substrate (with electric field perpendicular to the surface of the substrate) leads to acceleration of ions toward the substrate at an angle nearly perpendicular to the substrate. Such accelerated ions, coupled with the etching chemicals, lead to etch rates that are much faster in a direction that is normal to the plane of the substrate as compared to directions parallel to the substrate. Undercut-etching of shutter material in the regions protected by photoresist is thereby substantially eliminated. Along sidewall surfaces 709 of mold 703, which are substantially parallel to the track of the accelerated ions, the shutter material is also substantially protected from the anisotropic etch. Such protected sidewall shutter material form the sidewall beams 716, 718 and 720 for supporting the shutter 712. Along other (non-photoresist-protected) horizontal surfaces of the mold, such as top horizontal surface 710 or bottom horizontal surface 708, the shutter material has been completely removed by the etch.

The anisotropic etch used to form the sidewall beams 716, 718 and 720 can be achieved in either an RF or DC plasma etching device as long as provision for electrical bias of the substrate, or of an electrode in close proximity of the substrate, is supplied. For the case of RF plasma etching, an equivalent self-bias can be obtained by disconnecting the substrate holder from the grounding plates of the excitation circuit, thereby allowing the substrate potential to float in the plasma. In some implementations, it is possible to provide an etching gas such as trifluoromethane ($CHF_3$), perfluorobutene ($C_4F_8$), or chloroform ($CHCl_3$) in which both carbon and hydrogen and/or carbon and fluorine are constituents in the etch gas. When coupled with a directional plasma, achieved again through voltage biasing of the substrate, the liberated carbon (C), hydrogen (H), and/or fluorine (F) atoms can migrate to the sidewalls 709 where they build up a passive or protective quasi-polymer coating. This quasi-polymer coating further protects the sidewall beams 716, 718 and 720 from etching or chemical attack.

Figure 7D:
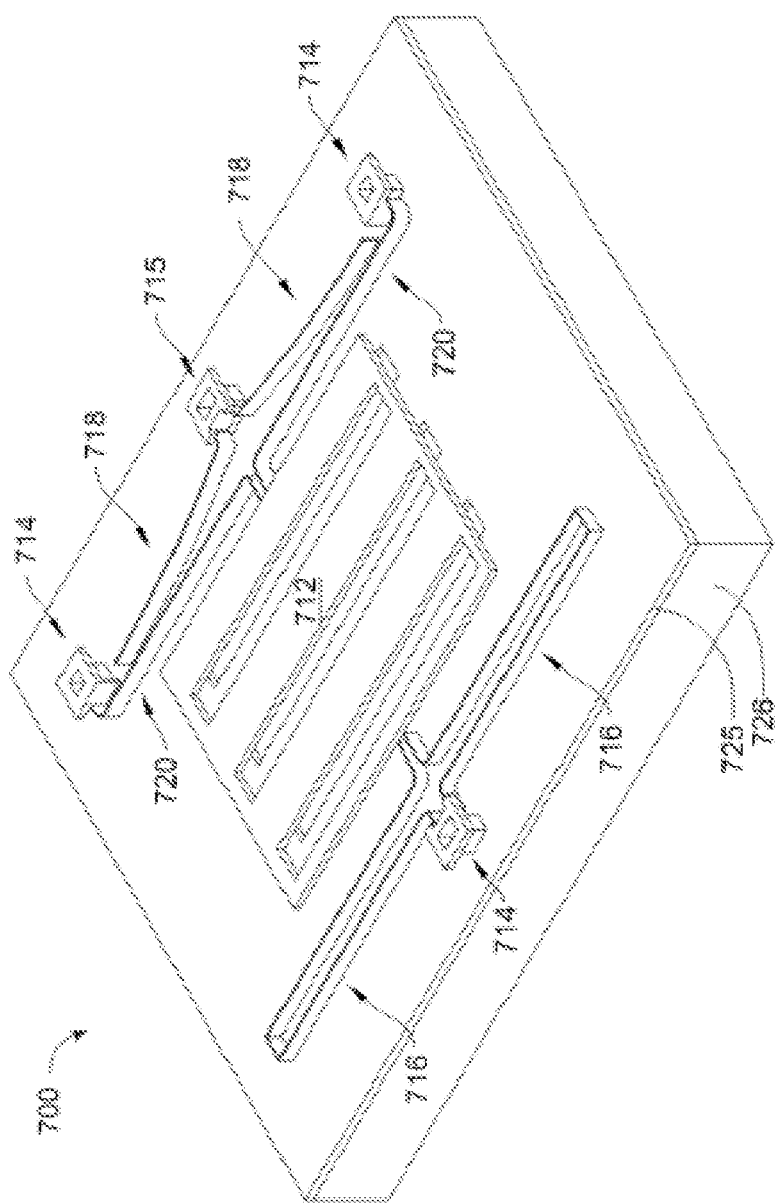

The process of forming sidewall beams is completed with the removal of the remainder of the second sacrificial layer 705 and the first sacrificial layer 701. The result is shown in FIG. 7D. The process of removing sacrificial material is similar to that described with respect to FIG. 6E. The material deposited on the sidewalls 709 of the mold 703 remain as the sidewall beams 716, 718 and 720. The sidewall beam 716 serves as a spring mechanically connecting the anchors 714 to the shutter 712, and providing a passive restoring force to counter the forces applied by the actuator formed from the compliant beams 718 and 720. The anchors connect to an aperture layer 725. The sidewall beams 716, 718 and 720 are tall and narrow. The width of the sidewall beams 716, 718 and 720, as formed from the surface of the mold 703, is similar to the thickness of the shutter material as deposited. In some implementations, the width of sidewall beam 716 will be the same as the thickness of shutter 712. In some other implementations, the beam width will be only about ½ the thickness of the shutter 712. The height of the sidewall beams 716, 718 and 720 is determined by the thickness of the second sacrificial material 705, or in other words, by the depth of the mold 703, as created during the patterning step described in relation to FIG. 7B. As long as the thickness of the deposited shutter material is chosen to be less than 2 microns, the method illustrated in FIGS. 7A-7D is well suited for the production of very narrow beams. In fact, for many applications the thickness range of 0.1 to 2.0 micron is quite suitable. Conventional photolithography would limit the patterned features shown in FIGS. 7A, 7B and 7C to much larger dimensions, for instance allowing minimum resolved features no smaller than 2 microns or 5 microns.

FIG. 7D depicts an isometric view of a shutter assembly 700, formed after the release step in the above-described process, yielding compliant beams with cross sections of high aspect ratio. As long as the thickness of the second sacrificial layer is, for example, greater than 4 times larger than the thickness of the shutter material, the resulting ratio of beam height to beam width will be produced to a similar ratio, i.e., greater than 4:1.

An optional stage, not illustrated above but included as part of the process leading to FIG. 7C, involves isotropic etching of the sidewall beam material to separate or decouple the compliant load beams 720 from the compliant drive beams 718. For instance, the shutter material at point 724 has been removed from the sidewall through use of an in isotropic etch. An isotropic etch is one whose etch rate is the same in all directions, so that sidewall material in regions such as point 724 is no longer protected. The isotropic etch can be accomplished in the typical plasma etch equipment as long as a bias voltage is not applied to the substrate. An isotropic etch also can be achieved using wet chemical or vapor phase etching techniques. Prior to this optional fourth masking and etch stage, the sidewall beam material exists essentially continuously around the perimeter of the recessed features in mold 703. The fourth mask and etch stage is used to separate and divide the sidewall material, forming the distinct beams 718 and 720. The separation of beams at point 724 is achieved through a fourth process of photoresist dispense, and exposure through a mask. The photoresist pattern in this case is designed to protect the sidewall beam material against isotropic etching at all points except at the separation point 724.

As a final stage in the sidewall process, an encapsulating dielectric is deposited around the outside surfaces of the sidewall beams.

In order to protect the shutter material deposited on sidewalls 709 of the mold 703 and to produce sidewall beams 716, 718 and 720 of substantially uniform cross section, some particular process guidelines can be followed. For instance, in FIG. 7B, the sidewalls 709 can be made as vertical as possible. Slopes at the sidewalls 709 and/or exposed surfaces become susceptible to the anisotropic etch. In some implementations, vertical sidewalls 709 can be produced by the patterning step of FIG. 7B, i.e., the patterning of the second sacrificial material 705, in an anisotropic fashion. The use of an additional photoresist coating or a hard mask in conjunction with patterning of the second sacrificial layer 705 makes it possible to employ aggressive plasmas and/or high substrate bias in the anisotropic etch of the second sacrificial material 705 without fear of excessive wear of the photoresist. Vertical sidewalls 709 also can be produced in photoimageable sacrificial materials as long as care is taken to control the depth of focus during the UV exposure and excessive shrinkage is avoided during final cure of the resist.

Another process specification that helps during sidewall beam processing relates to the conformality of the shutter material deposition. The surfaces of the mold 703 are preferably covered with similar thicknesses of shutter material, regardless of the orientation of those surfaces, either vertical or horizontal. Such conformality can be achieved when depositing with a chemical vapor deposition technique (CVD). In particular, the following conformal techniques can be employed: plasma enhanced chemical vapor deposition (PECVD), low pressure chemical vapor deposition (LPCVD), and atomic or self-limited layer deposition (ALD). In the above CVD techniques the growth rate of the thin film can be limited by reaction rates on a surface as opposed to exposing the surface to a directional flux of source atoms. In some implementations the thickness of material grown on vertical surfaces is at least 50% of the thickness of material grown on horizontal surfaces. Alternatively, shutter materials can be conformally deposited from solution by electroless plating or electroplating, after a metal seed layer is provided that coats the surfaces before plating.

The process leading to the shutter assembly 700 in FIG. 7D was a 4-mask process, meaning the process incorporated 4 distinct photolithography stages in which a photo-sensitive polymer is exposed by illuminating a desired pattern through a photomask. The photolithography stages, also known as masking steps, are amongst the most expensive in the manufacture of MEMS devices, and so it is desirable to create a manufacturing process with a reduced number of masking steps.

Figure 8:
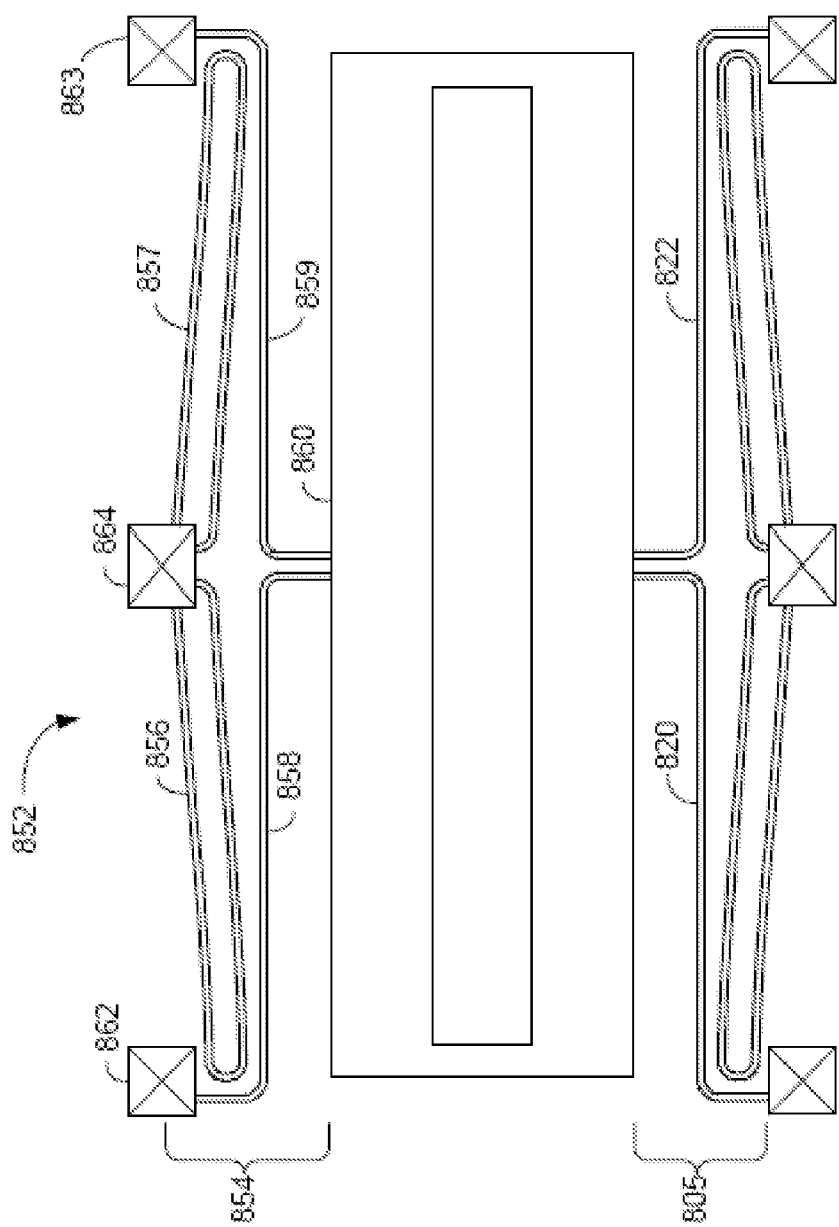
FIG. 8 shows a plan view of a shutter assembly incorporating a looped drive beam.

FIG. 8 shows a plan view of a shutter assembly 852 incorporating a looped drive beam. The looped drive beam forms part of a dual compliant actuator assembly 854. The dual compliant actuator assembly 854 functions similarly to the actuator 404 designed for the shutter assembly 400 of FIGS. 4A and 4B. The actuator assembly 854 includes compliant drive beams 856 and 857, along with compliant load beams 858 and 859. The load beams 858 and 859 support a shutter 860 on one end and are respectively attached to load beam anchors 862 and 863 at the other end. The drive beams 856 and 857 are shaped as a loop. Each end of the drive beams 856 and 857 is attached to a common anchor 864. Along the loop, there is a section of outgoing beam which is substantially parallel to a returning section of the same beam. The lengths of these two loop sections are equal. When formed in a sidewall beam process, the stresses which would tend to deform the outgoing section of the drive beams 856 and 857 will mirror or oppose the stresses along the returning section of beam.

The compliant beams that make up the drive beams 856 and 857 can be completely defined using only the first three mask stages described with respect to shutter assembly 700 depicted in FIGS. 7A-7D. The fourth photo-lithography stage, in which the drive beam is separated from the load beam is not used to manufacture the beams 856 and 857. The loops completely enclose or form the periphery around the boundary of a space. Since there is no termination in the loops (as is expected for the boundary around an enclosed space) the fourth photo-lithography stage is not required.

In order to eliminate the fourth mask completely, a method is sought whereby other compliant beams in the structure are also made to incorporate shapes analogous to loops. A termination of a sidewall beam is not necessary as long as the beam forms a boundary which completely encloses a space. Load beam 858 in shutter assembly 852 is terminated at the load beam anchor 862, and so in this implementation, a fourth masking stage is used to terminate the beam 858 at the anchor 862.

Figure 9:
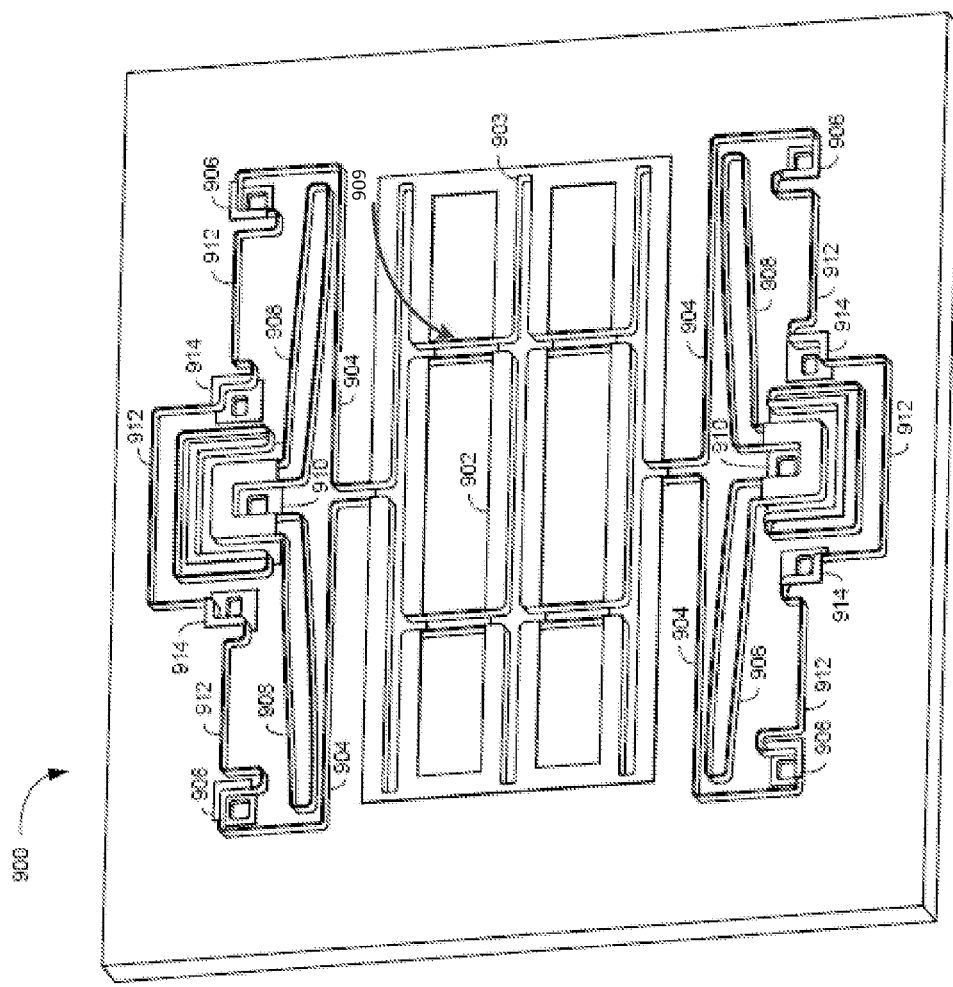
FIG. 9 shows an isometric view of a shutter assembly built according to a 3-mask process.

FIG. 9 shows an isometric view of a shutter assembly 900 built according to a 3-mask process. That is, the shutter assembly 900 can be manufactured using only three masking steps. Those 3 masking steps are referred to as an anchor definition step, a mold definition step, and a shutter definition step, used to develop patterns into a first sacrificial layer, a second sacrificial layer, and shutter material, respectively. As described with respect to shutter assembly 700, the compliant beams are formed at the sidewalls of the mold, also referred to as the second sacrificial layer. The shutter assembly 900 can be fabricated using a 3-mask process because the beams are designed as closed boundaries that enclose the periphery of features in the mold.

The shutter assembly 900 includes a shutter 902, stiffening ribs 903, load beams 904, load beam anchors 906, drive beams 908, and drive beam anchors 910. The drive beams 908 are formed into a loop, which is attached to the substrate at anchor 910. The drive beams 908 enclose the space within the loop. The shutter assembly additionally includes peripheral beams 912 as well as peripheral anchors 914. The load beams 904 and the drive beams 908 together form a set of compliant actuator beams. When a voltage is imposed between these two beams, the shutter is caused to move between open and closed positions.

The load beams 904 extend from the shutter to the load beam anchors 906. The peripheral beams extend from the load beam anchors 906 to the peripheral anchors 914. The peripheral beams also connect together the peripheral anchors 914. In some implementations, the peripheral beams 912 do not play an active mechanical function or an optical function within the shutter assembly 900. The peripheral beams 912 serve to extend the geometry of the load beams 904 so that these compliant beams can become connected. Together, the load beams 904 and peripheral beams 912 form a boundary which completely encloses a space.

Figure 10:
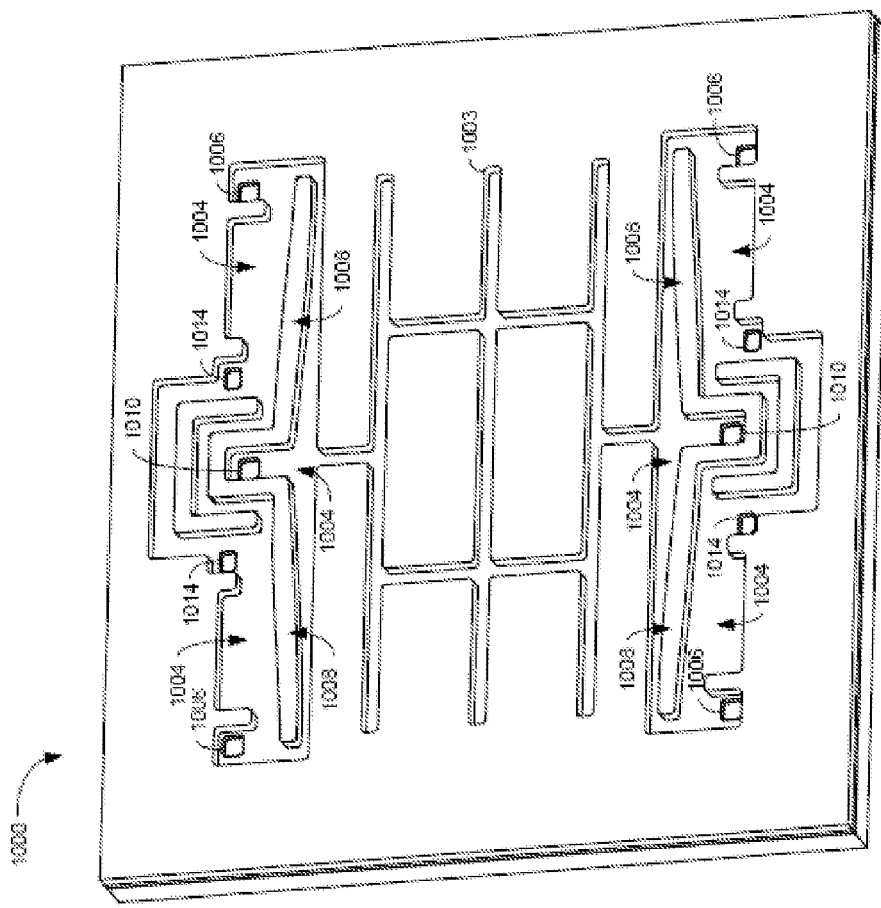
FIG. 10 shows an example mold suitable for manufacture of the shutter assembly of FIG. 9.

FIG. 10 shows an example mold 1000 suitable for manufacture of the shutter assembly 900 of FIG. 9. The mold 1000 is formed from a second sacrificial material, and is patterned as part of the 2D photo-lithography step in the fabrication of shutter assembly 900. FIG. 10 shows the mold 1000 before the shutter material has been deposited. The outlines of the shutter 902 are therefore not present in FIG. 10. The mold 1000 does, however, include rib indentations 1003 that will be used to shape stiffening ribs shown in shutter assembly 900.

The mold 1000 generally includes 3 kinds of surfaces. The mold 1000 includes sidewalls, upon which the compliant beams will be formed, as well as upper and lower surfaces. The lower surfaces of the mold are the horizontal surfaces formed by the interface between first and second sacrificial materials that form the mold 1000. The upper surfaces of the mold are horizontal surfaces in a plane most distant from an underlying substrate.

The mold 1000 generally defines two kinds of shapes, both of which are enclosed or bounded by sidewalls upon which the compliant beams can be formed. A mesa, as used herein, is a space defined by a presence of mold material enclosed by mold sidewalls. A recess, as used herein, is defined by a space of mold material absence, enclosed by mold sidewalls.

The mold 1000 includes mesa shapes 1008. The sidewalls which enclose the mesas 1008 are used to form the drive beams 908. The drive beams will thereby have the shape of loops without termination.

The mold 1000 also includes a recess 1004. The sidewalls which enclose this recess 1004 are used to form the load beams 904.

The mold 1000 also includes load beam anchor holes 1006. The load beam anchor holes 1006 were formed in a previous stage as part of the first sacrificial layer. The mold 1000 also includes a drive beam anchor hole 1010.

Both the load beams 904 and the drive beams 908 in shutter assembly 900 are therefore formed as boundaries that completely enclose a space. The spaces are formed from one of either a mesa shape or a recess shape in the mold 1000. The boundaries of the shapes that form the load beams 904 and the drive beams 908 do not intersect. The loop for the drive beam 908 is completely enclosed within the loop that forms the load beam 904.

As set forth above, some shutter assemblies, such as shutter assembly 900, exhibit the propensity for allowing light to unintentionally escape from an aperture, even while in the closed position. The sources of light leakage identified above can be addressed in part by modifications to the shutter design. As will be described in relation to FIGS. 11-14, light leakage resulting from the reflection of light from the underside of a closed shutter can be mitigated by introducing ribs or depressions into the shutter that are relatively large in relation to the size of the light blocking portion of the shutter and/or the size of a corresponding aperture layer aperture. These ribs also advantageously add to the stiffness of the shutter and prevent bending. By replacing vertical walls within shutter apertures with ribs that run along the length of the shutter, also depicted in FIGS. 11-14, light leakage can be mitigated without sacrificing shutter rigidity. As will be described in to FIGS. 16A-19, light leakage due to refraction can be mitigated by angling various perimeter surfaces of the shutter such that they are neither parallel nor normal to the display normal.

Figure 11:
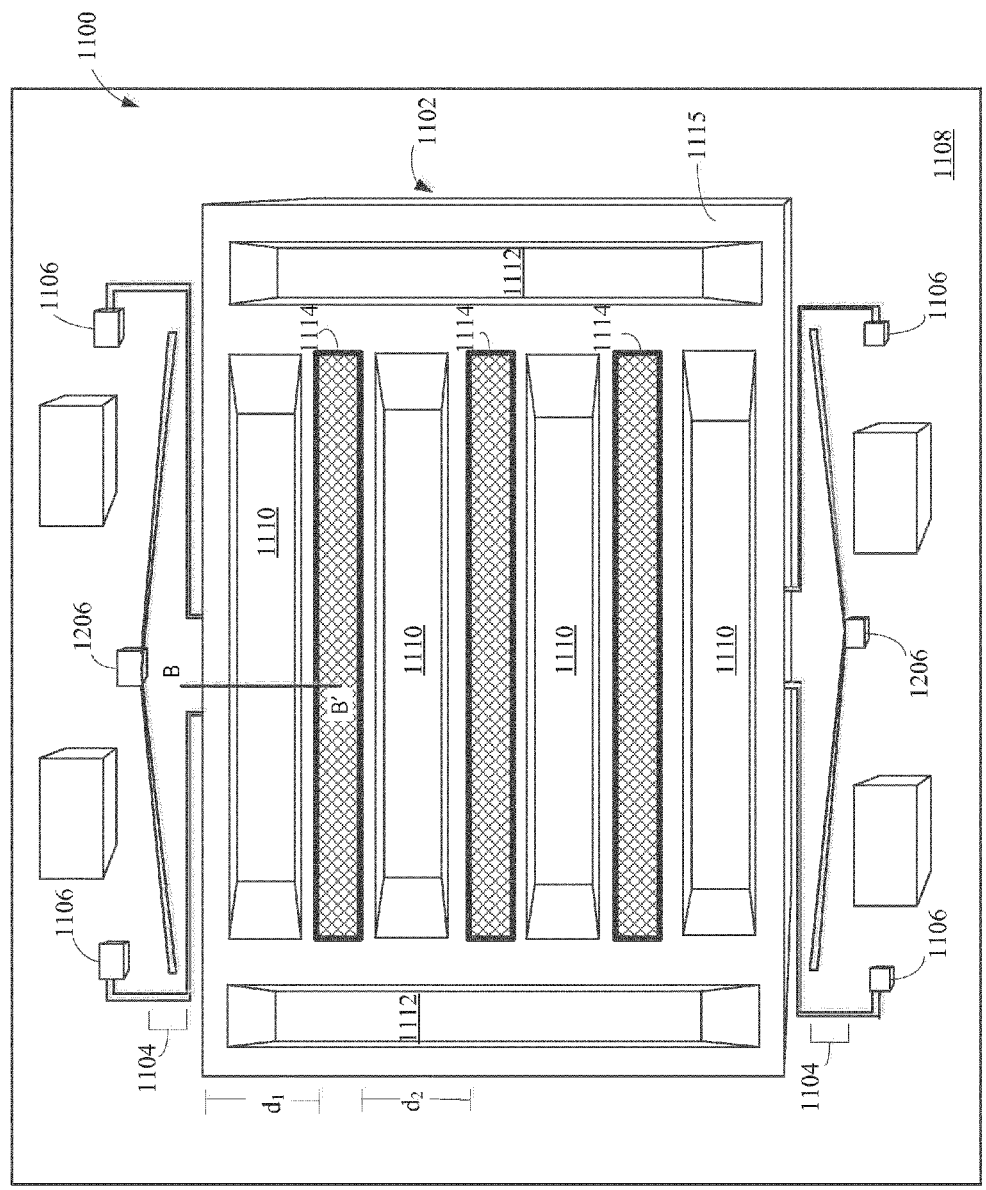
FIG. 11 shows a top view of another example shutter assembly.

FIG. 11 shows a top view of another example shutter assembly 1100. The shutter assembly 1100 includes a shutter 1102, two electrostatic actuators 1104 and anchors 1106 supporting the shutter 1102 and actuators 1104 over a substrate 1108. Like shutter 903, the shutter 1102 includes a set of rib indentations, also referred to as depressions. More particularly, the shutter 1102 includes four lateral depressions 1110 and two longitudinal depressions 1112.

The lateral depressions 1110 extend across the shutter 1102 having a length that is perpendicular to the direction of motion of the shutter 1102. Their length runs parallel to a set of a shutter apertures 1114 formed into the shutter 1102 to allow light to pass through when the shutter 1102 is in an open position. The shutter apertures 1114 are formed in a substantially planar surface 1115 of the shutter. The substantially planar surface 1115 corresponds to portion of the shutter that was formed on the outermost surface of a corresponding mold.

In contrast to rib indentations 903 of the shutter 902 of FIG. 9, the lateral depressions 1110 of the shutter 1102 extend for a substantial portion of the distance between neighboring edges of the shutter. In some implementations, the lateral depressions 1110 account for at least about 50% of the distance between shutter edges, such as the distance $d_1$ between an outer perimeter edge of the shutter 1102 and the edge of the closest shutter aperture 1114, or the distance $d_2$ between the edges of neighboring shutter apertures. In some other implementations, the width of the lateral depressions 1108 account for at least about 50%, at least about 60%, at least about 70%, or at least about 80% of the distance between shutter edges. The lateral depressions 1110 and 1112 can further be characterized by their depth to width aspect ratio. In some implementations, the depth to width of the lateral depressions 1110 and 1112 are at least about 1:1, less than about 2:3, or less than about 1:2. As described further below, relatively wide depressions serve to prevent light reflecting off the underside of the shutter while in the closed position from reflecting back towards the front, and potentially out, of a display incorporating the shutter 1102.

The longitudinal depressions 1112 have a length that is parallel to the direction of motion of the shutter 1102. They are located between the side edges of the shutter 1102 and the side edges of the shutter apertures 1112, and thus may be referred to as "side ribs" or "side depressions." Like the lateral depressions 1110, the width of the longitudinal depressions 1110 account for substantial portions of the distance between the edge of the shutter and the edge of the shutter apertures 1114. In some implementations, the longitudinal depressions 1112 extend substantially the entire length of the shutter 1102. In some other implementations, the longitudinal depressions 1112 are shorter. In some other implementations, a shutter may include multiple longitudinal impressions 1112 on a given side, one after the other, along the length of the shutter 1102.

In general, the longitudinal depressions 1112 provide additional stiffness to the shutter 1102, helping prevent deformation of the shutter 1112. Similar stiffness was provided in the shutter 902 of shutter assembly 900 by vertical walls 909 passing through the shutter apertures 905. Openings at the base of these vertical walls 909 were found, however, to provide opportunities for higher angle light to leak through the shutter 902, even in a closed position. By moving the vertical walls outside of the apertures, in the form of the longitudinal depressions 1112, the shutter 1102 is able to obtain a similar degree of stiffness while avoiding the potential light leakage.

As mentioned above, individually, each depression accounts for a substantial portion of the distance between the shutter edges. Collectively, in some implementations, the depressions also account for a substantial portion of the overall area of the light blocking portions of the shutter (i.e., the area of the shutter 1102 excluding the shutter apertures 1112). In some implementations, the depressions account for at least 50% of the area of the light blocking portion of the shutter 1102. In some other implementations, the depressions 1110 and 1112 account for at least 60%, at least 70%, at least 80% or more of the area of the light blocking portion of the shutter 1102.

Figure 12:
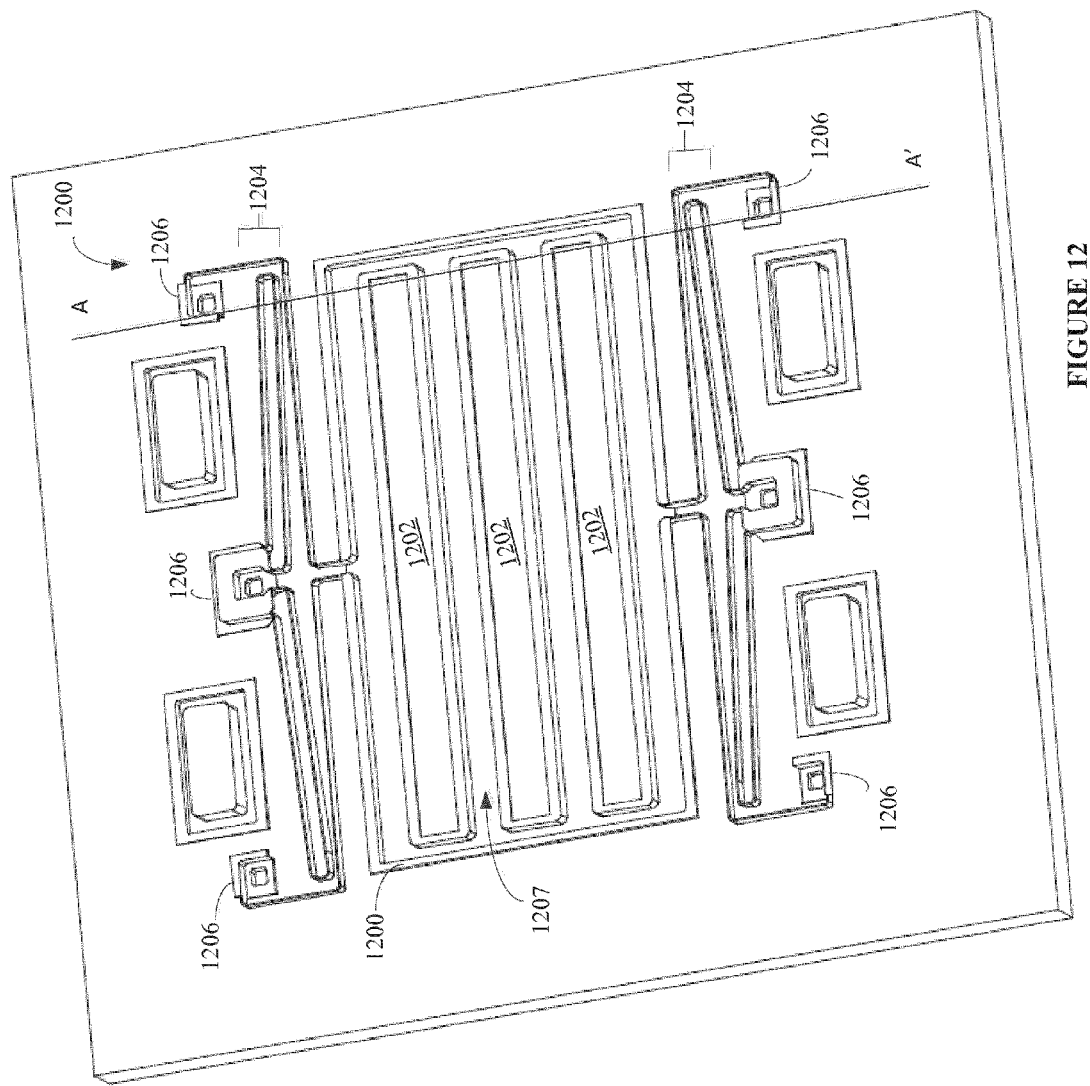
FIG. 12 shows an isometric view of another example shutter assembly.

FIG. 12 shows an isometric view of another example shutter assembly 1200. The shutter assembly 1200 includes a shutter 1202, two electrostatic actuators 1204, and anchors 1206 supporting the shutter 1202 and actuators 1204 over a substrate 1208. In FIG. 12, unlike shutter 1102 depicted in FIG. 11, the shutter 1202 includes one continuous depression 1207 that surrounds three shutter apertures 1212. While not having distinct lateral and longitudinal depressions, the continuous depression 1207 can be considered to have lateral and longitudinal depression portions. Like the distinct lateral and longitudinal depressions 1110 and 1112 of shutter 1102 depicted in FIG. 11, each of the lateral and longitudinal portions of the continuous depression 1207 accounts for a substantial portion of the distance between neighboring edges of the shutter. In various implementations, the depression portions can account for at least 50%, at least 60%, at least 70%, at least 80% or more of the distance between neighboring shutter edges. In addition, in some implementations, the aspect ratio of the lateral portions of the continuous depression 1207 is less than about 1:1, less than about 2:3, or less than about 1:2.

Figure 13:
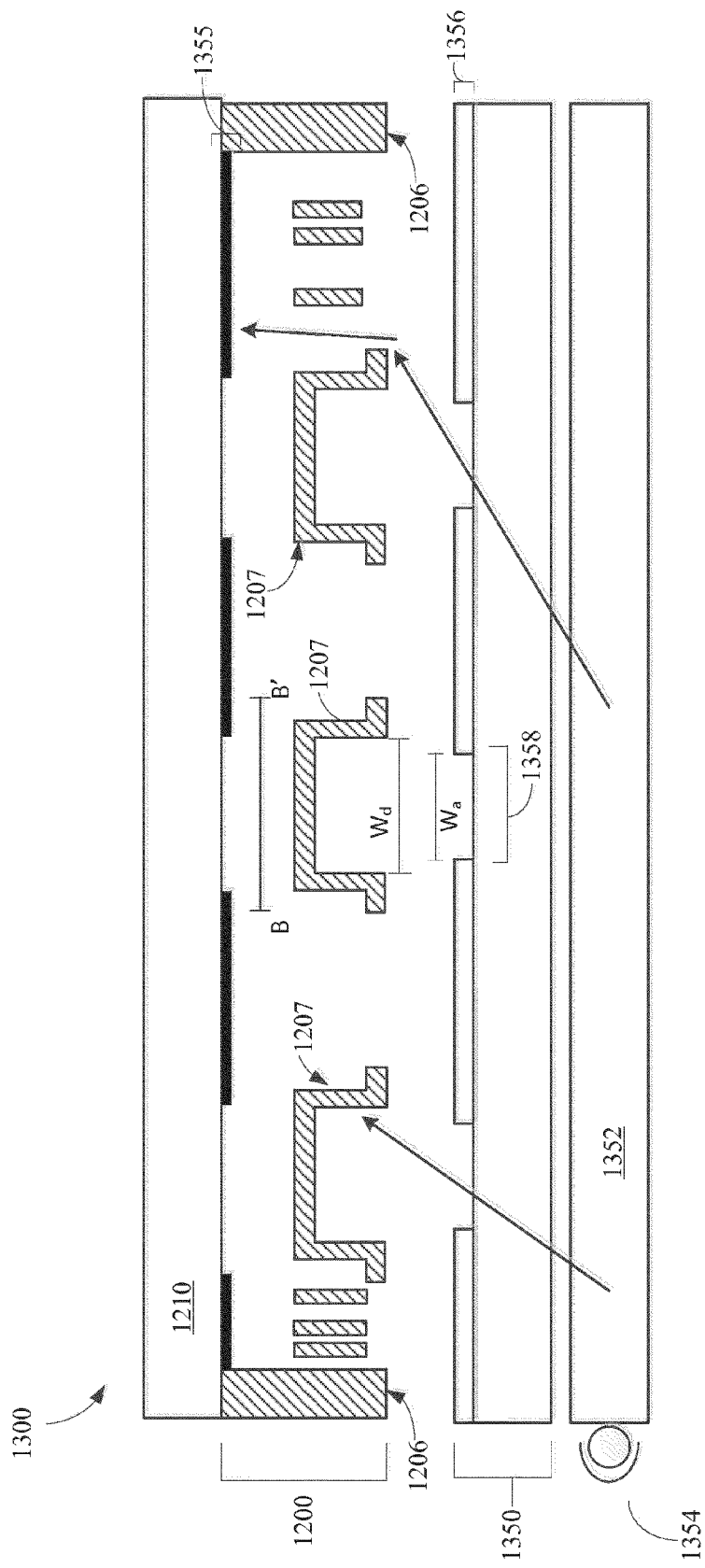
FIG. 13 shows a cross sectional view of a portion of an example display apparatus.

FIG. 13 shows a cross section of a portion of an example display apparatus 1300 including the shutter assembly 1200 of FIG. 12. The display apparatus 1300 is built according to a MEMS-down configuration and the shutter assembly 1200 is in a closed position. The cross section is taken at line A-A' of FIG. 12.

Referring to FIGS. 12 and 13, the display apparatus 1300 includes an aperture plate 1350, a backlight 1352, and a light source 1354 for introducing light into the backlight 1352. In addition, a black matrix (not shown in FIG. 12) is deposited on the substrate 1210 to improve contrast. The aperture plate 1350 includes an aperture layer 1356, which defines apertures 1358 through which light can exit the backlight 1352 towards the front of the display to be modulated by the shutter assembly 1200. The aperture layer 1356, in some implementations, includes a rear facing reflective layer and a front facing light absorbing layer.

In the display apparatus 1300, the continuous depression 1207 of the shutter assembly 1200 protrudes towards the substrate 1210 on which it was built such that the continuous depression 1207 opens towards the aperture layer 1356. In this configuration, when the shutter 1202 is in the closed position, light exiting through the aperture layer 1356 at most angles impacts the shutter 1202 on an interior surface of the continuous depression 1207. Thus, before this light can be reflected back towards the front of the display apparatus 1300, it is likely to reflect off of at least one, if not two, additional interior surfaces of the depression 1207. As the shutter 1202 is not fabricated from a highly reflective material, each reflection absorbs a substantial portion of the remaining light energy, thereby significantly reducing the amount of light that may potentially leak out of the display apparatus 1300.

As depicted in FIG. 13, the width ($W_d$) of the continuous depression 1207 is relatively large in relation to the width ($W_a$) of the apertures. As depicted, $W_d$ is greater than $W_a$. In some other implementations, $W_d$ is at least 50% the size of $W_a$. In some other implementations, $W_d$ is at least 60%, at least 70%, or at least 80% of $W_a$. The relatively large size of $W_d$ with respect to $W_a$ helps promote light passing through the apertures in contacting an interior surface of the depression 1307.

Figure 14:
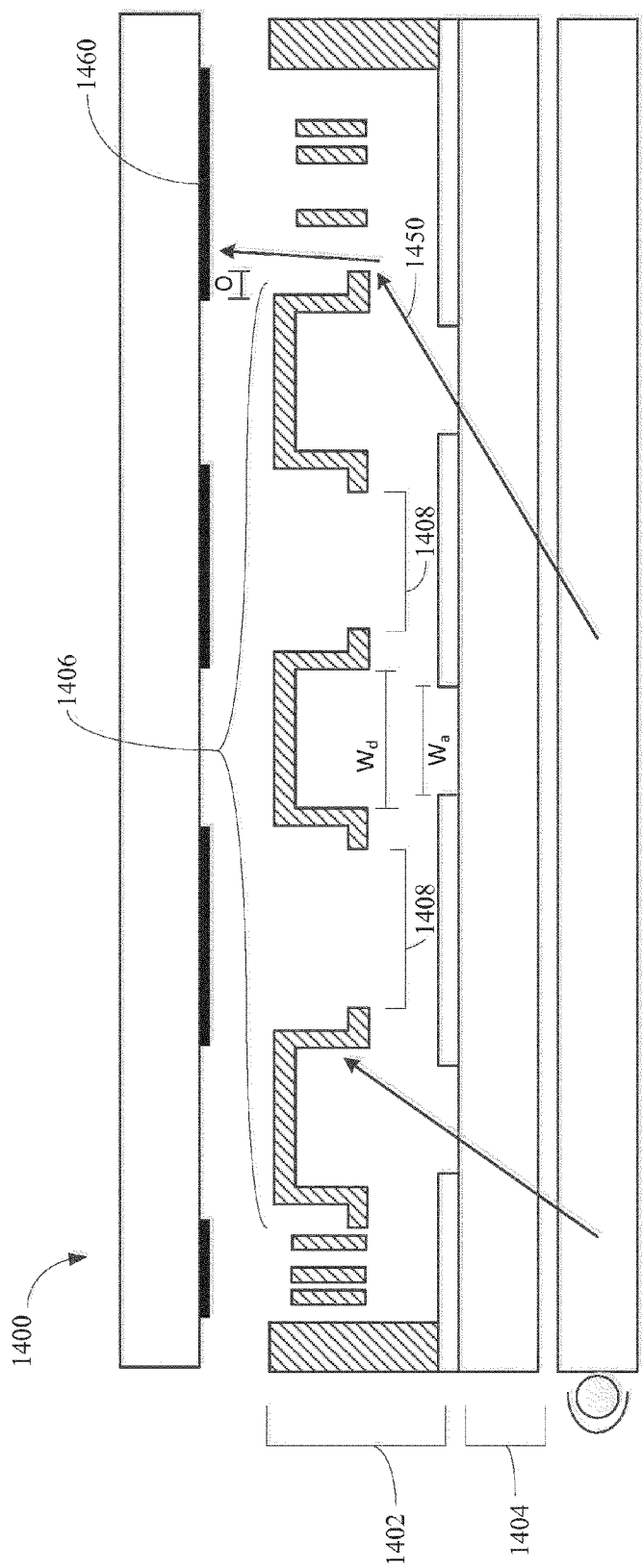
FIG. 14 shows a cross section of a portion of another example display apparatus.

FIG. 14 shows a cross section of a portion of another example display apparatus 1400. The display apparatus 1400 is substantially similar to the display apparatus 1400 of FIG. 1400, though display apparatus 1400 is built in the MEMS-up configuration. That is, the shutter assembly included in display apparatus 1400, shutter assembly 1402, is formed directly on an aperture plate 1404, instead of on an opposing substrate, as depicted in FIG. 14. The shutter assembly 1402, like the shutter assembly 1300, includes a shutter 1406 that has a continuous depression having lateral depression portions and longitudinal depression portions surrounding several shutter apertures 1408. Only the lateral depression portions 1410 are visible in the cross section depicted in FIG. 14.

In FIGS. 11-14, the depressions included in each of the shutter assemblies included substantially vertical sidewalls, with surfaces that were either parallel or normal to the surface of the substrate on which they were built. Other depression shapes may be employed in some other implementations. In addition, each of the depicted shutter assemblies has included only a single depression (or depression portion) between any pair of neighboring shutter edges. In some other implementations, shutters can include multiple depressions between neighboring shutter edges. In some other implementations, the depressions account for less of the distance between shutter edges then suggested above.

FIGS. 15A-15I show example alternative cross sectional shapes suitable for shutter depressions. Each of the cross sectional shapes depicted in FIGS. 15A-15I correspond to shapes for the cross section B-B' depicted in FIG. 11.

FIG. 15A shows a cross-section of a shutter depression 1500 having sloped walls. FIG. 15B shows a cross-section of a shutter depression 1510 having reentrant sloped walls. FIG. 15C includes a substantially circular depression 1520.

FIGS. 15D and 15E show V-shaped depressions 1530. While the V-shaped depression 1530 depicted in FIG. 15C does not take up a substantial portion of the distance between shutter edges, in some other implementations, V-shaped depressions can be formed having much shallower angles.

Such shallow V-shaped depressions can account for a substantial portion of such distance. Alternatively, as depicted in FIG. 15E, a shutter can include multiple V-shaped depressions 1530 between two neighboring shutter edges. In FIG. 15E, together, three V-shaped depressions 1530 account for a substantial portion of the distance between shutter edges.

FIGS. 15F-15I depict alternative shutter cross-sectional shapes while retaining substantially horizontal and substantially vertical surfaces, yielding rectangular depressions 1540. FIG. 15F depicts a portion of a shutter that includes multiple, relatively low-aspect ratio rectangular depressions 1540. FIG. 15G depicts a portion of shutter having a rectangular depression 1540 that is offset from the center of the shutter portion. That is, the rectangular depression 1540 is closer to one of the shutter edges than the other. FIG. 15H depicts a shutter portion with a central rectangular depression 1540 with vertical side walls at either edge of the shutter portion. FIG. 15I shows a shutter portion having two rectangular depressions 1540 at either end of the shutter portion. A substantially planar surface separates the rectangular depressions 1540.

Each of the alternative shutter cross-sectional shapes depicted in FIGS. 15A-15I can be achieved using manufacturing processes similar to those described above in relation to FIGS. 7A-7D. Specifically, in some implementations, the shutters including the depicted shutter portions are formed by patterning and etching structural materials deposited onto a two layered mold. Material deposited on the upper-most surface of the mold serves as the lower surface of the shutter portions when placed in the MEMS-down orientation (i.e., in the orientation depicted in FIGS. 15A-15I). The bottom of the respective depressions are formed from material deposited at the interface between the two mold layers. The shapes formed in the mold can be formed using standard photopatterning and etching processes. For example, the angled surfaces of the sloped-wall depression 1500 or the V-shaped depressions 1530 can be achieved by patterning the upper mold layer using halftone or high-energy beam-sensitive glass masks to vary the penetration of the exposure light into the mold material. Other shapes, such as the reentrant-walled shutter depression 1510 can be achieved by using reentrant-angle mold material commonly used in lift-off processes.

The shutter portion depicted in 15H provides additional advantages, in that the edges of the shutter portion are out of the direct path of light exiting a backlight. As indicated above, in some implementations, the shutters disclosed herein are formed from several layers of material, including an interior metal layer. If the edges of such shutters are substantially parallel to the upper or lower mold layers, the anisotropic etching process and/or the release process used in manufacturing the shutters can remove portions of the outer shutter layer at those edges, exposing the underlying internal metal layer.

Exposed shutter edges can refract high angle incident light towards the front of the display apparatus. This refraction phenomenon is depicted in FIG. 14. In FIG. 14, light 1450 refracts off of the edge of the right most portion of shutter 1402 towards the front of the display apparatus 1400. To prevent such light from exiting the display, thereby reducing its contrast ratio, a black matrix 1460 of display apparatus 1400 is applied to substantially overlap the edge of the shutter 1402 by an overlap O. While this overlap prevents light leakage resulting from the refraction phenomenon, it reduces the aperture ratio and range of angles that can be emitted from the display. Locating the shutter edges out of the path of high angle light, as depicted in FIG. 15H, can reduce and in some cases eliminate the potential for light leakage from refraction off of shutter edge, thereby obviating the reason for black matrix overlap. Thus, displays including such shutters can expand the openings in the black matrix, providing for increased viewing angles and brighter displays.

FIG. 16A shows a top view of an example shutter 1600 having angled perimeter surfaces. FIG. 16B shows a cross section of the shutter 1600 of FIG. 16A. The cross section is taken at the line C-C' of FIG. 16A. Referring to FIGS. 16A and 16B, the shutter 1600 includes a continuous depression 1602 surrounding two shutter apertures 1604. The shutter 1600 includes two types of angled perimeter surfaces; an angled outer perimeter surface 1606 and two angled shutter aperture perimeter surfaces 1608, one around each shutter aperture 1604 (collectively the "angled perimeter surfaces 1606 and 1608"). The angled perimeter surfaces 1606 and 1608 angle down away from the upper-most surfaces 1610 of the shutter in the same direction as the continuous depression 1602. In both FIGS. 16A and 16B, the shutter 1600 is depicted from the perspective of how the shutter would be formed in a mold. Thus, when introduced into a display apparatus, in some implementations, the shutter 1600 would be flipped such that the continuous depression 1602 would open towards the rear of the display apparatus and the angled perimeter surfaces 1606 and 1608 would extend towards the front of the display apparatus.

In some implementations, the angled perimeter surfaces 1606 and 1608 are angled at between about 20 degrees and about 70 degrees of the plane of the shutter 1600. In some implementations, the angled perimeter surfaces 1606 and 1608 are angled at between about 40 degrees and about 50 degrees of the plane of the shutter. In some other implementations, the angled perimeter surfaces 1606 and 1608 are angled at 45 degrees of the plane of the shutter. In general, the angle selected is a function of one or more of the width of the continuous depression 1602, the degree to which the angled perimeter surfaces 1606 and 1608 overlap corresponding portions of an aperture layer while the shutter 1600 is in the closed position, and the dimensions of an accompanying black matrix. In some implementations, the outer perimeter surface 1606 is angled at the same angle as the shutter aperture perimeter surfaces 1608. In some other implementations, the outer perimeter surface 1606 is angled at a different angle than the shutter aperture perimeter surfaces 1608. In still some other implementations of the shutter 1600, only the outer perimeter surface 1606 or only the shutter aperture perimeter surfaces 1608 are angled.

In this implementation, the walls of the continuous depression 1602 are substantially vertical, or normal to the plane of the shutter 1600. In some implementations, the walls of the continuous depression 1602 are angled as well.

FIG. 17 shows an example cross section of a mold 1700 for forming an example shutter with angled perimeter surfaces. For example, the mold 1700 can be used to form the shutter 1600 of FIGS. 16A and 16B. Referring to FIGS. 16A, 16B and 17, unlike the molds described above, for example, in relation to FIG. 7A-7C or FIG. 10, which include horizontal surfaces at two levels, the mold 1700 includes horizontal surfaces at three levels. The mold 1700, though, is still made from just two layers of mold material, and thus can still be fully patterned using only two patterning steps. The lower-level horizontal surfaces 1702 correspond to the interface 1703 between a lower mold material 1704 and an upper mold material 1706. It is on these lower-level horizontal surfaces 1702 that the floor of the continuous depression 1602 of shutter 1600 is formed. The intermediate-level horizontal surfaces 1708 correspond to the areas that will be etched to form the shutter apertures 1604 and the spaces between shutters. The upper-most horizontal surfaces 1710 correspond to the areas on which the upper-most surfaces 1610 of shutter 1600 are formed.

FIG. 18 shows a cross section of a portion of an example display apparatus 1800 including a shutter 1802 having angled perimeter surfaces. The display apparatus 1800 is built according to a MEMS-up configuration with the shutter 1802 in a closed position.

The shutter 1802 is part of a shutter assembly 1803 formed on an aperture plate 1850. The display apparatus 1800 also includes a backlight 1852 and a light source 1854 for introducing light into the backlight 1852. In addition, a black matrix 1855 is deposited on a cover plate 1810 to improve contrast. The aperture plate 1850 includes an aperture layer 1856, which defines apertures 1858 through which light can exit the backlight 1852 towards the front of the display apparatus 1800 to be modulated by the shutter assembly 1803. The aperture layer 1856, in some implementations, includes a rear facing reflective layer and a front facing light absorbing layer.

In the display apparatus 1800, the shutter 1802 includes a continuous depression 1807 that protrudes towards the cover plate 1810 such that the depression 1807 opens towards the aperture layer 1856. In this configuration, when the shutter 1806 is closed, light exiting through the aperture layer 1856 at most angles impacts the shutter 1802 on an interior surface of the continuous depression 1807. Thus, before this light can be reflected back towards the front of the display apparatus 1800, it is likely to reflect off of at least one, if not two, additional interior surfaces of the continuous depression 1807.

As depicted in FIG. 18, the width ($W_d$) of the continuous depression is relatively large in relation to the width of the apertures ($W_a$). While $W_d$ is less than $W_a$ in the depicted implementation, $W_d$ is still at least 80% of the size of $W_a$. In some other implementations, $W_d$ is at least 50% the size of $W_a$. In some other implementations, $W_d$ is at least 60% or at least 70% of $W_a$. In still other implementations, $W_d$ is greater than $W_a$. The relatively large size of $W_d$ with respect to $W_a$ helps promote light passing through the apertures in contacting an interior surface of the depression 1807.

In contrast to the display apparatus 1400 of FIG. 14, the shutter assembly 1803 of display apparatus 1800 includes a shutter 1802 having angled perimeter surfaces 1812. Thus, the edges of the shutter 1802 are out of the path of high angle light that refracted off of the edges of the shutter 1307 in the display apparatus of FIG. 14. As a result, the display apparatus 1800 forgoes the overlap between the black matrix 1855 and the edges of the shutter 1802. Instead, in some implementations, the edges of the black matrix 1855 substantially align with the edges of the shutter 1802.

Figure 19:
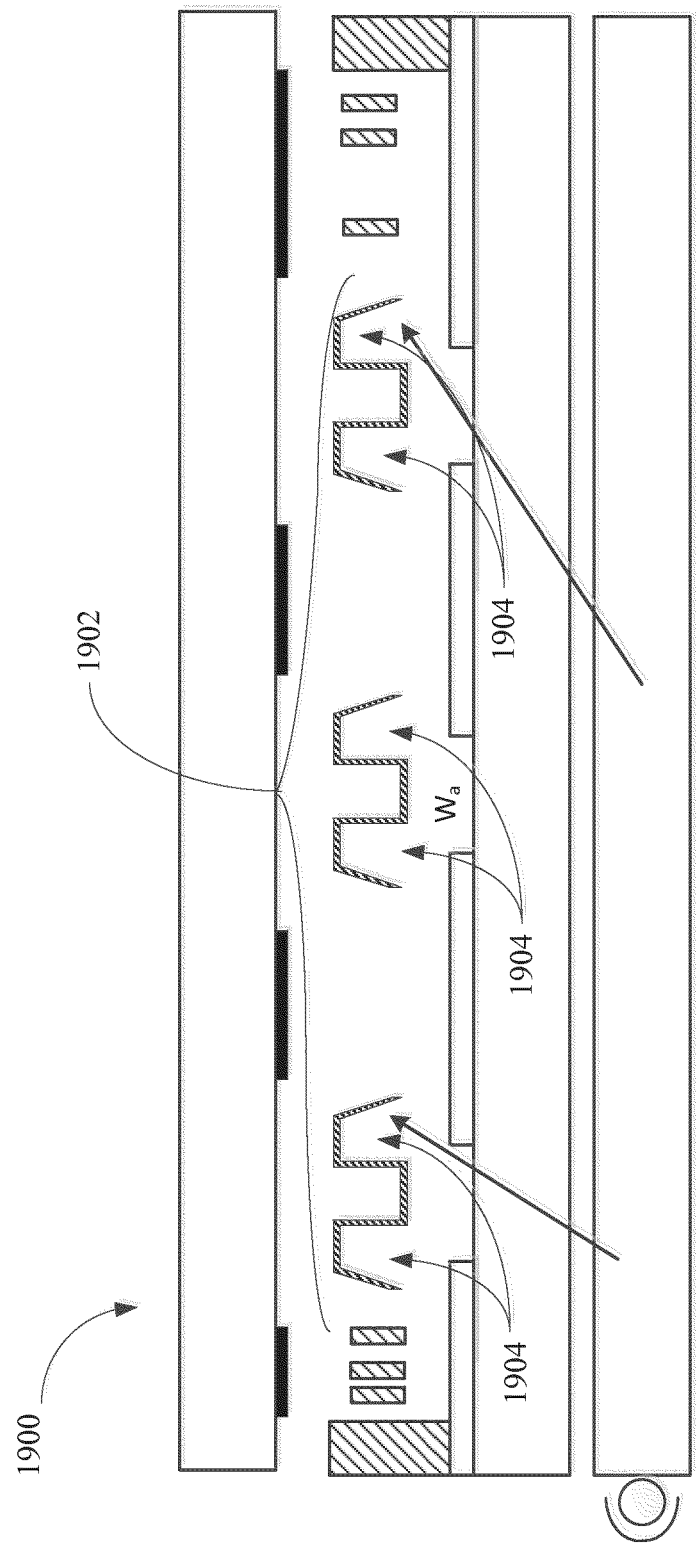
FIG. 19 shows a cross section of another example display apparatus including a shutter with angled perimeter surfaces.

FIG. 19 shows a cross section of a portion of another example display apparatus 1900 including a shutter 1902 with angled perimeter surfaces. The display apparatus 1900 is built according to a MEMS-up configuration with the shutter 1902 in a closed position. In contrast to the shutter 1802 of the display apparatus 1800 of FIG. 18, the shutter 1902 includes two continuous depressions 1904. In addition, one wall of each depression 1904 serves as an angled perimeter surface, as the depressions extend right up to the edges of the shutter 1902. Moreover, the angled surfaces of the shutter 1902 extend towards the rear of the display apparatus 1900, instead of towards the front. The depressions, being positioned up to the edges of the shutter, are particularly effectively at trapping light. Moreover, by angling the edges of shutter 1902 to form angled perimeter surfaces, light is less likely to refract towards the front of the display apparatus 1900.

Figure 20:
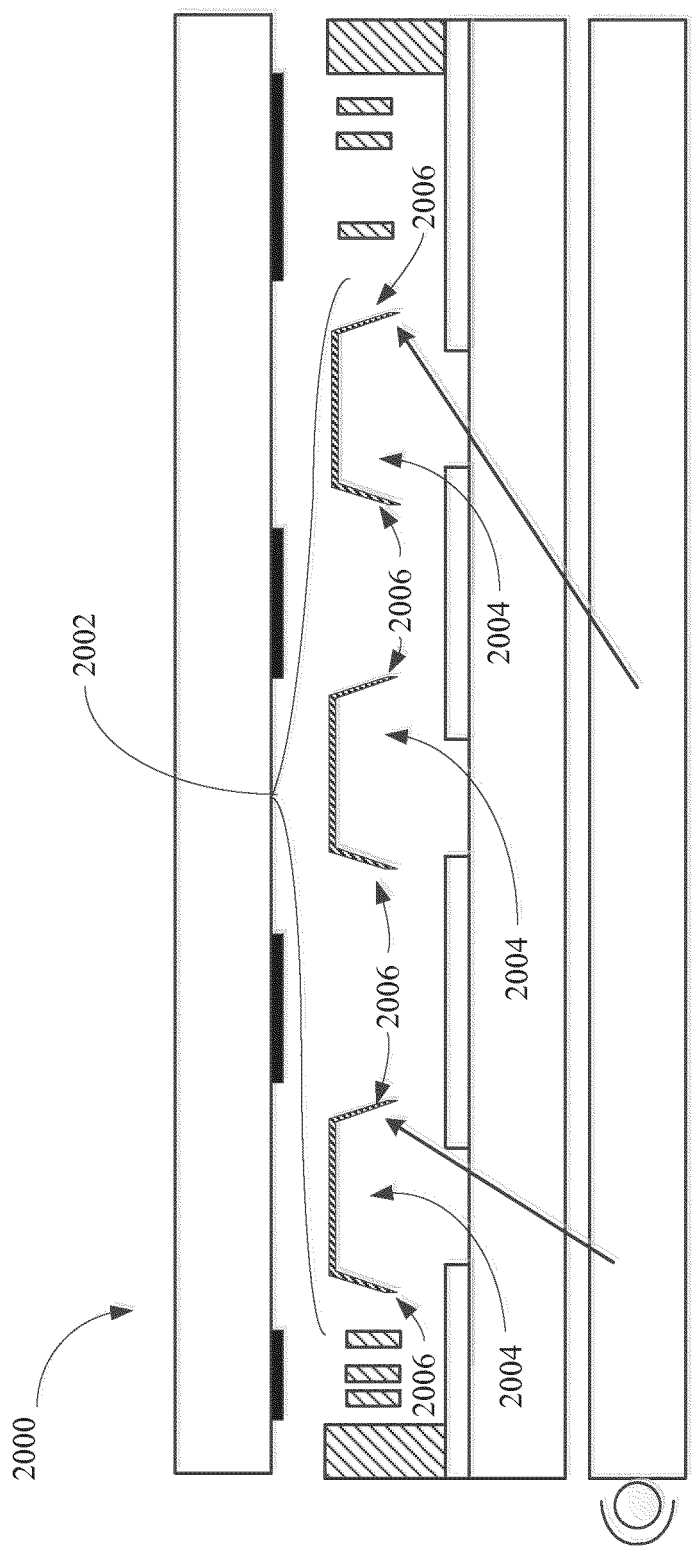
FIG. 20 shows a cross section of a portion of another example display apparatus 2000 including a shutter 2002 with angled perimeter surfaces.

FIG. 20 shows a cross section of a portion of another example display apparatus 2000 including a shutter 2002 with angled perimeter surfaces. The display apparatus 2000 is built according to a MEMS-up configuration with the shutter 2002 in a closed position. In contrast to the shutter 1902 of the display apparatus 1900 of FIG. 19, the shutter 2002 includes only a single, larger continuous depression 2004 bounded by the angled perimeter surfaces 2006 that form the exterior wall of the shutter and that surround the shutter aperture. Like the shutter 1902 of FIG. 19, the angled surfaces 2006 of the shutter 2002 extend towards the rear of the display apparatus 2000, instead of towards the front. The depression 2004, extending up to the edges of the shutter, is particularly effectively at trapping light. Moreover, by angling the edges of shutter 2002 to form angled perimeter surfaces 2006, light is less likely to refract towards the front of the display apparatus 2000.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display apparatus, comprising:
    a backlight;
    an aperture layer positioned in front of the backlight defining a plurality of apertures; and
    a microelectromechanical system (MEMS) light modulator configured to modulate light emitted by the backlight passing through the apertures to form an image on the display apparatus, the MEMS light modulator including a shutter having:
        a light blocking portion having an aperture layer-facing surface and a front-facing surface; and
        at least one depression formed in the light blocking portion, wherein a width of the at least one depression is shorter than a length of the at least one depression and the width of the at least one depression accounts for at least 50% but less than 100% of a distance separating two edges of the shutter, wherein the at least one depression formed in the light blocking portion is wider than a corresponding aperture in the aperture layer.

2. The display apparatus of claim 1, wherein the at least one depression opens towards the aperture layer.

3. The display apparatus of claim 1, wherein the at least one depression has a length, a width, and a depth, such that the width is greater than the depth.

4. The display apparatus of claim 1, wherein:
    the shutter further includes a shutter aperture for, in an open position, allowing light to pass through the shutter; and
    the two edges of the shutter include an outer perimeter edge of the shutter and an edge of the shutter aperture.

5. The display apparatus of claim 4, wherein the shutter includes at least two depressions between the outer perimeter of edge of the shutter and the edge of the shutter aperture.

6. The display apparatus of claim 4, wherein the depression is offset from a center location between the two edges of the shutter such that the depression is closer one of the two edges than to the other of the two edges.

7. The display apparatus of claim 1, wherein:
    the shutter further comprises a shutter aperture for, in an open position, allowing light to pass through the shutter; and
    a side depression positioned between the shutter aperture and a side of the shutter such that the length of the depression is perpendicular to the length of the shutter aperture.

8. The display apparatus of claim 1, wherein the at least one depression includes at least one longitudinal depression portion and at least one lateral depression portion.

9. The display apparatus of claim 1, wherein the shutter includes a perimeter surface having an angle with respect to a normal of the display that is at least about 20 degrees.

10. The display apparatus of claim 9, wherein the angle of the perimeter surface with respect to the display normal is less than about 70 degrees.

11. The display apparatus of claim 1, comprising
    a processor configured to process image data; and
    a memory device that is configured to communicate with the processor.

12. The display apparatus of claim 11, further comprising:
    a driver circuit configured to send at least one signal to one of the MEMS light modulator and the backlight; and wherein
    the processor is further configured to send at least a portion of the image data to the driver circuit.

13. The display apparatus of claim 11, further comprising:
    an input device configured to receive input data and to communicate the input data to the processor.

14. A display apparatus, comprising:
    a backlight;
    an aperture layer positioned in front of the backlight defining a plurality of apertures; and
    a microelectromechanical system (MEMS) light modulator configured to modulate light emitted by the backlight passing through the apertures to form an image on the display apparatus, the MEMS light modulator including a shutter having:
        a light blocking portion having an aperture layer-facing surface and a front-facing surface;
        a shutter aperture for allowing light to pass through the shutter in an open position; and
        at least one depression formed in the light blocking portion, wherein a width of the at least one depression is shorter than a length of the at least one depression and the at least one depression is positioned between the aperture and a first side of the shutter such that the length of the depression is perpendicular to the length of the shutter aperture, wherein the shutter includes a perimeter surface having an angle with respect to a normal of the display in the range of about 20 degrees to about 70 degrees.

15. The display apparatus of claim 14, including at least a second depression positioned between the aperture and a second side of the shutter, the second side connected to the first side, such that the length of the second depression is parallel to the length of the aperture.

16. The display apparatus of claim 14, wherein the area of the at least one depression takes up at least 50% of the area of the light blocking portion of the shutter.

17. The display apparatus of claim 14, wherein the at least one depression has a length, width, and depth, such that the width is greater than the depth.

18. The display apparatus of claim 14, wherein the at least one depression in the light blocking portion of the shutter opens toward the aperture layer.

19. The display apparatus of claim 14, wherein the at least one depression includes at least one longitudinal depression portion and at least one lateral depression portion.

20. The display apparatus of claim 14, wherein the at least one depression formed in the light blocking portion is wider than a corresponding aperture in the aperture layer.

21. A display apparatus, comprising:
a backlight;
an aperture layer positioned in front of the backlight defining a plurality of apertures; and
a microelectromechanical system (MEMS) light modulator configured to modulate light emitted by the backlight passing through the apertures to form an image on the display apparatus, the MEMS light modulator including a shutter having:
a light blocking portion having an aperture layer-facing surface and a front-facing surface; and
at least one depression formed in the light blocking portion, wherein the at least one depression is wider than a corresponding aperture in the aperture layer.

22. The display apparatus of claim 21, wherein the at least one depression has a length, a width, and a depth, such that the width is at least 1.5 times the depth.

23. The display apparatus of claim 21, wherein the area of the at least one depression takes up at least 50% of the area of the light blocking portion of the shutter.

24. The display apparatus of claim 21, wherein the at least one depression includes at least one longitudinal depression portion and at least one lateral depression portion.

25. The display apparatus of claim 21, wherein the shutter comprises a perimeter surface having an angle with respect to a normal of the display that is at least about 20 degrees.

26. The display apparatus of claim 25, wherein the angle of the perimeter surface with respect to the display normal is less than about 70 degrees.

27. The display apparatus of claim 21, wherein the at least one depression is offset from a center position between a shutter aperture edge and a perimeter edge of the shutter.

28. A display apparatus, comprising:
a backlight;
an aperture layer positioned in front of the backlight defining a plurality of apertures; and
a microelectromechanical system (MEMS) light modulator configured to modulate light emitted by the backlight passing through the apertures to form an image on the display apparatus, the MEMS light modulator including a shutter having a light blocking portion which is predominantly perpendicular to a display normal, and which has at least one perimeter surface angled between 20 degrees and 70 degrees with respect to a display normal.

29. The display apparatus of claim 28, wherein the at least one perimeter surface includes a surface immediately adjacent an outer perimeter of the shutter.

30. The display apparatus of claim 29, wherein the shutter comprises a shutter aperture having a shutter aperture perimeter, and the at least one perimeter surface includes a surface immediately adjacent the shutter aperture perimeter.

31. The display apparatus of claim 28, wherein the at least one perimeter surface is angled towards the aperture layer.

32. The display apparatus of claim 28, wherein the at least one perimeter surface is angled away from the aperture layer.

* * * * *